US006252834B1

(12) United States Patent
Kumagai

(10) Patent No.: US 6,252,834 B1
(45) Date of Patent: *Jun. 26, 2001

(54) OPTICAL DISC DEVICE AND OPTICAL DISC DISCRIMINATING METHOD

(75) Inventor: Eiji Kumagai, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,985

(22) Filed: Jan. 5, 1998

(30) Foreign Application Priority Data

Jan. 10, 1997 (JP) .................................................. 9-014773

(51) Int. Cl.⁷ ....................................................... G11B 7/00
(52) U.S. Cl. ..................................... 369/44.29; 369/44.35; 369/116; 369/124.1
(58) Field of Search ............................. 369/44.27, 44.29, 369/44.41, 54, 58, 44.12, 116, 44.26, 44.35, 44.36, 94, 112, 124.01, 124.1, 124.11, 124.12

(56) References Cited

U.S. PATENT DOCUMENTS

| 5,003,521 | * | 3/1991 | Yoshida et al. ................. 369/44.25 |
| 5,235,581 | * | 8/1993 | Miyagawa et al. .............. 369/44.12 |
| 5,289,451 | * | 2/1994 | Ashinuma et al. .................. 369/58 |
| 5,453,607 | * | 9/1995 | Ando et al. .................. 369/44.41 X |
| 5,586,098 |   | 12/1996 | Nishida et al. . |
| 5,592,448 |   | 1/1997 | Suzuki et al. ..................... 369/44.28 |

(List continued on next page.)

FOREIGN PATENT DOCUMENTS

| 0745982 A2 | 12/1996 | (EP) ................. G11B/7/09 |
| 0766234 | 4/1997 | (EP) ................. G11B/7/09 |
| 0 811 971 A2 | 12/1997 | (EP) . |
| 0 813 192 A1 | 12/1997 | (EP) . |
| 2304226 | 3/1997 | (GB) ................... G11B/27/36 |
| 62-168159 | 10/1987 | (JP) . |
| 8-227552 | 2/1995 | (JP) . |
| 8-241566 | 3/1995 | (JP) . |
| 9-91757 | 4/1997 | (JP) . |
| 9-161387 | 6/1997 | (JP) . |
| 9-161388 | 6/1997 | (JP) . |

OTHER PUBLICATIONS

Application No. 08/915,877, Feb. 1, 2000.

Patent Abstracts of Japan, JP 8–83465, published Mar. 26, 1996, Sony Corporation.

Primary Examiner—Paul W. Huber
(74) Attorney, Agent, or Firm—Oblon, Spivak, McClelland, Maier & Neustadt, P.C.

(57) ABSTRACT

An optical disc device including a laser light source for radiating a laser light beam illuminated via an objective lens on a signal surface of an optical disc, a laser light volume detection unit for detecting the light volume of the laser light radiated from the laser light source, an automatic power controlling unit for controlling a laser output of the laser light source so that a detection output by the laser light volume detection unit will be constant, a return light detection unit for detecting the return light of the laser light beam radiated by the laser light source and reflected by the signal surface of the optical disc, a focusing control unit for displacing the objective lens along the optical axis responsive to focusing error signals generated on the basis of a detection output of the return light detection unit for controlling the focusing state of a beam spot of the laser light on the signal surface of the optical disc and a controlling unit for controlling the closed-loop gain of the automatic power controlling means to a gain in meeting with the reflectivity of the optical disc based on a detection output of the return light detection unit which prevails when focusing is applied to the signal surface of the optical disc by the focusing control unit.

33 Claims, 22 Drawing Sheets

U.S. PATENT DOCUMENTS

| | | | |
|---|---|---|---|
| 5,636,196 | 6/1997 | Kumagai | 369/124 |
| 5,665,957 * | 9/1997 | Lee et al. | 369/58 X |
| 5,703,852 | 12/1997 | Kumagai | 369/48 |
| 5,724,325 | 3/1998 | Jeong | 369/58 X |
| 5,745,461 | 4/1998 | Kawasaki . | |
| 5,757,745 | 5/1998 | Takeya . | |
| 5,790,493 | 8/1998 | Takeya et al. . | |
| 5,831,952 * | 11/1998 | Yamada et al. | 369/44.27 X |
| 5,831,953 | 11/1998 | Numata . | |
| 5,917,791 * | 6/1999 | Tsuchiya et al. | 369/58 |
| 6,005,932 | 12/1999 | Kumagai | 369/44.27 |

* cited by examiner

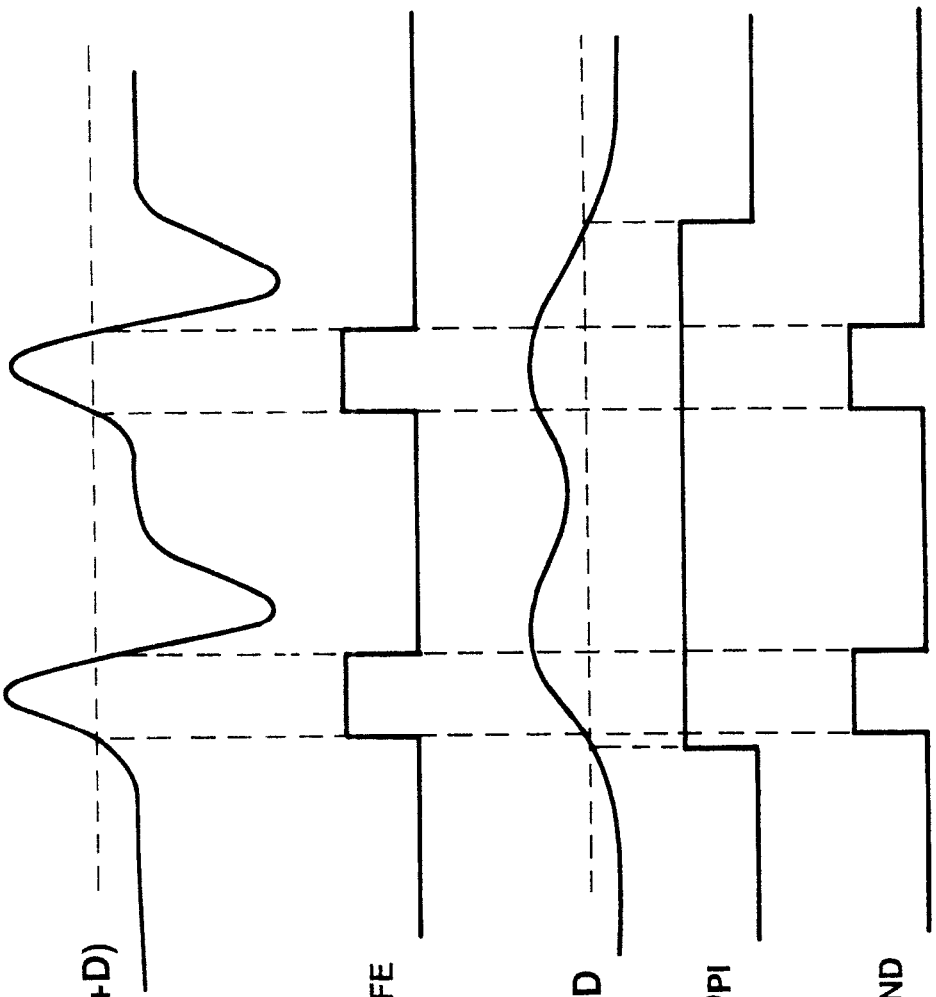

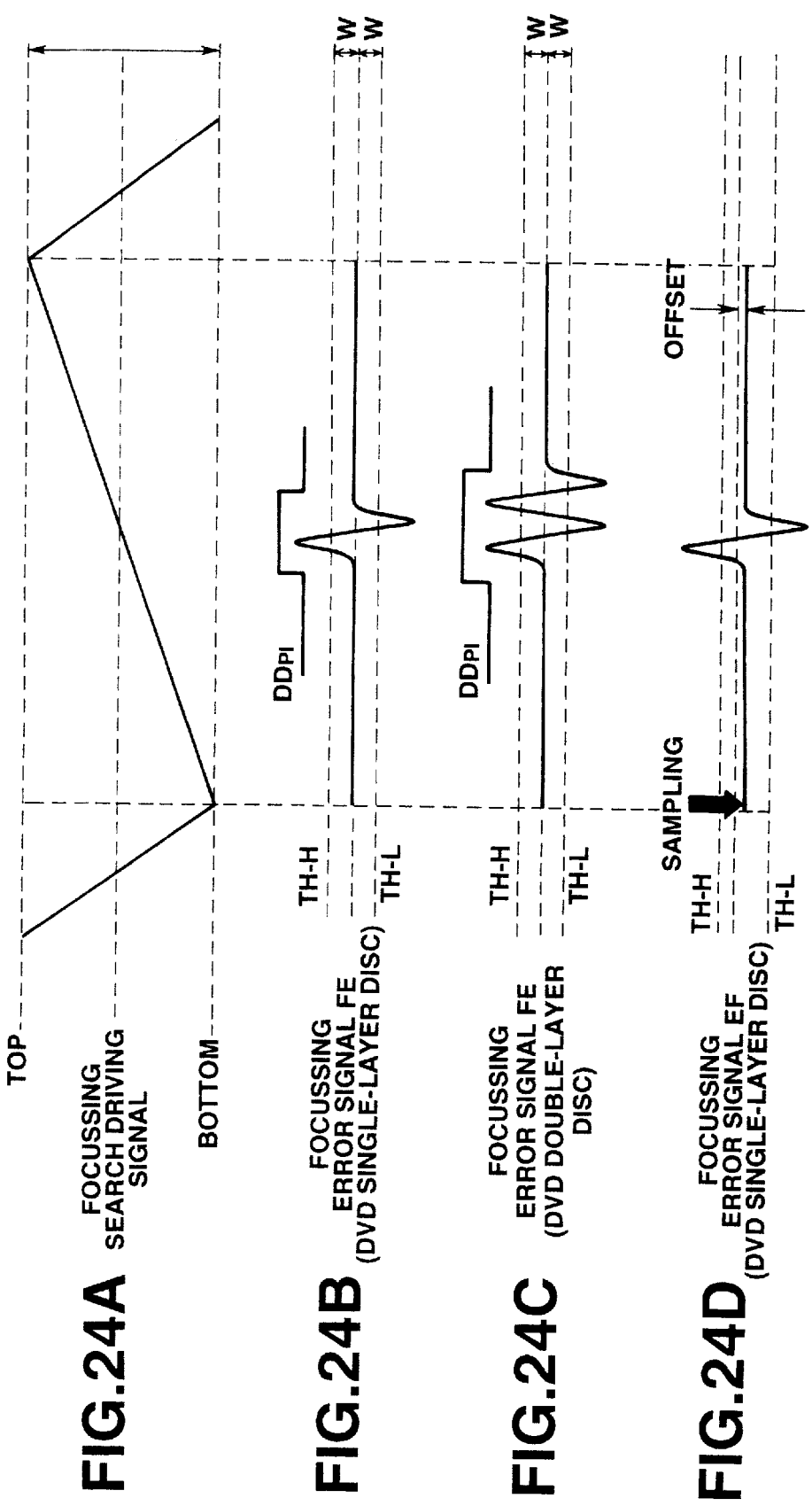

OPTICAL DISC DEVICE AND OPTICAL DISC DISCRIMINATING METHOD

BACKGROUND OF THE INVENTION

1. Field of the invention

This invention relates to an optical disc device capable of coping with plural types of optical discs, and a method for discriminating optical discs.

2. Description of Related Art

As optical discs, compact discs are in widespread use, such that optical discs of the CD type are used in many fields, to say nothing of the field of musical application. The CDs for music are usually designed as replay-only media. However, an overwrite type disc termed compact disc recordable (CD-R) is also commercialized.

On the other hand, an optical disc termed a digital versatile disc/digital video disc (DVD) has also been developed as an optical disc suitable for multimedia use. This DVD is proposed as being adaptable to a wide field of applications, such as for video data, audio data or computer data. The DVD, which is an optical disc of the same size as the CD (12 cm in diameter), has a significantly increased recording capacity.

Meanwhile, in keeping pace with development of a new optical disc, it becomes desirable to provide an optical disc device exhibiting interchangeability between conventional and newer types of optical discs.

As for the DVD, it is desirable to develop an optical disc device capable of coping with both the CD and the DVD. However, since the CD and the DVD differ in reflectivity depending on, for example, the difference in structure of the signal recording layer of the optical disc, the RF signals obtained by an optical pickup is varied in signal level, depending on the optical disc type, whilst optimum values of parameters of various servo systems, such as focusing servo or tracking servo systems, are also changed.

Therefore, an optical disc device, adapted for coping with plural optical disc types, is required to correctly discriminate the type of optical disc on loading the optical disc thereon.

If the disc is of the type in which an optical disc is housed in a cartridge, the disc type can be easily discriminated by providing a cartridge discriminating hole. However, if the optical disc is not of the type housed in a cartridge, and moreover the optical disc itself is of the same size, this mechanical discrimination system cannot be used.

Moreover, if special components or units are provided for discriminating the disc type, such as a sensor, the device is undesirably complicated in structure, while the manufacturing costs are also raised.

SUMMARY OF THE INVENTION

It is therefore an object of the present invention to provide an optical disc device and an optical disc discriminating method in which plural optical disc types having different numbers of signal recording layers are discriminated and an operating mode corresponding to the optical disc type is set by control means based on the discriminating output for reliably reproducing the plural types of optical discs.

In one aspect, the present invention provides an optical disc device including a laser light source for radiating a laser light beam illuminated via an objective lens on a signal surface of an optical disc, laser light volume detection means for detecting the light volume of the laser light radiated from the laser light source, automatic power controlling means for controlling a laser output of the laser light source so that a detection output by the laser light volume detection means will be constant, return light detection means for detecting the return light of the laser light beam radiated by the laser light source and reflected by the signal surface of the optical disc, focusing control means for displacing the objective lens along the optical axis responsive to the focusing error signals generated on the basis of a detection output of the return light detection means for controlling the focusing state of a beam spot of the laser light on the signal surface of the optical disc and controlling means for controlling the closed-loop gain of the automatic power controlling means to a gain in meeting with the reflectivity of the optical disc based on a detection output of the return light detection means which prevails when focusing is applied to the signal surface of the optical disc by the focusing control means.

In another aspect, the present invention provides an optical disc device including a laser light source for radiating a laser light beam illuminated via an objective lens on a signal surface of an optical disc, laser light volume detection means for detecting the light volume of the laser light radiated from the laser light source, automatic power controlling means for controlling a laser output of the laser light source so that a detection output by the laser light volume detection means will be constant, return light detection means for detecting the return light of the laser light beam radiated by the laser light source and reflected by the signal surface of the optical disc, focusing control means for displacing the objective lens along the optical axis responsive to the focusing error signals generated on the basis of a detection output of the return light detection means for controlling the focusing state of a beam spot of the laser light on the signal surface of the optical disc and controlling means for controlling the closed-loop gain of the automatic power controlling means to a gain in meeting with the reflectivity of the optical disc based on a detection output of the return light detection means which prevails when focusing is applied to the signal surface of the optical disc by the focusing control means.

BRIEF DESCRIPTION OF THE DRAWINGS

FIGS. 20A–20E are waveform diagrams showing a disc discrimination signal for a double-layer disc.

FIGS. 24A–24D are waveform diagrams for illustrating the disc discrimination signal in the sequence of operations for discriminating the single-layer disc and the double-layer disc.

DESCRIPTION OF PREFERRED EMBODIMENTS

Figure 1A:
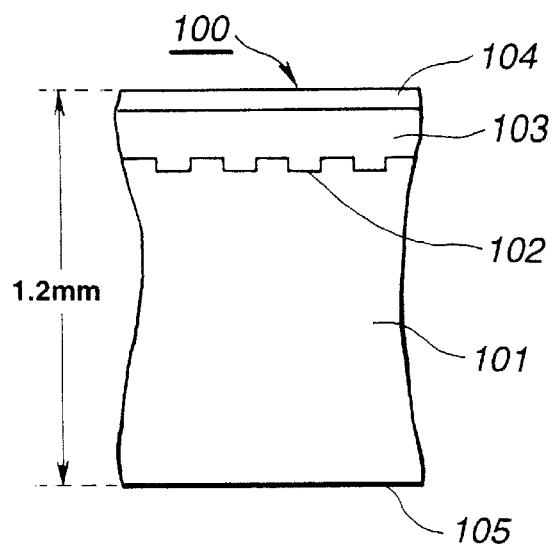
FIGS. 1A–1C illustrate the structure of an optical disc associated with an optical disc device embodying the invention.

Referring to the drawings, preferred embodiments for carrying out the present invention will be explained in detail.

The present invention is applied to an optical disc device associated with a CD and a DVD. Before proceeding to the explanation of the optical disc device embodying the invention, the structures of the CD, CD-R and the DVD will be explained with reference to FIG. 1. Meanwhile, the CD, CD-R and the DVD are all discs 12 cm in diameter.

Figure 1B:
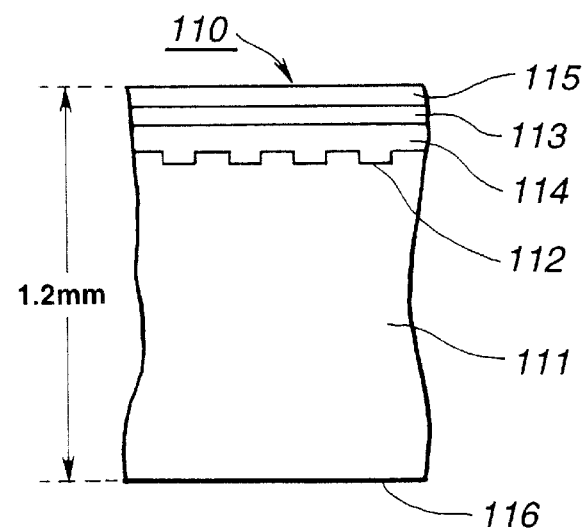
Figure 1C:
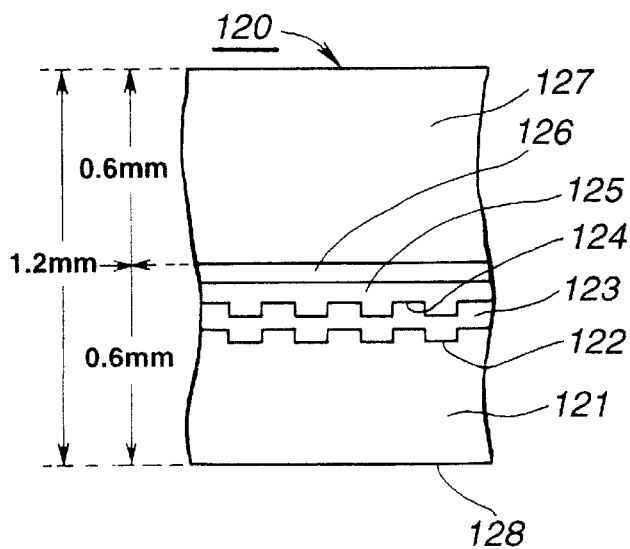

FIGS. 1a, 1b and 1c illustrate a layered structure as cross-sections of the CD, CD-R and the DVD. As shown in these figures, the overall disc thickness of each of the CD, CD-R and the DVD is approximately 1.2 mm.

On the CD 100 shown in FIG. 1a, a disc substrate (transparent layer) 101 is molded from a transparent synthetic resin material, such as a transparent polycarbonate resin, polyvinyl chloride or acrylic resin, having high light transmission, mechanical resistance and resistance against chemicals. On a major surface of the disc substrate 101 are transcribed pits by a stamper assembled into a mold die. These pits in the signal surface 102 are formed in the disc substrate 101 as encoded orifices having different circumferential lengths in association with pre-set information signals for constituting a recording track. On the surface of the disc substrate 101 carrying the signal surface 102 is deposited aluminum having high light reflectance for forming a reflective layer 103 as a signal recording layer. The entire assembly is covered by a protective layer 104 for completing a CD 100.

On this CD 100, a laser light beam from the disc driving device falls from the disc surface 105 so that the information recorded on the signal surface 102 is detected from the reflected laser light.

FIG. 1b shows a CD-R 110 which is a medium permitting the overwriting. The CD-R 110 has the physical properties, such as diameter, weight and thickness, in common with the CD 100. However, the CD-R 110 can be manufactured economically in smaller quantities and longer in durability than the CD 100 and hence is suited for data storage.

On this CD-R 110 is also arranged a disc substrate (transparent layer) 111 looking from the disc surface 116. On the disc substrate 111 are layered an organic dye layer 114, as a signal recording layer, a gold reflective layer, 113 as a protective layer 115, in this order, for completing the CD-R 110. In this CD-R 110 is also formed a groove operating as laser light illumination guide during recording and which is covered by the organic dye layer 114. The organic dye layer 114 is reacted with polycarbonate of the disc substrate 111, under the heat of the illuminated laser light, for forming the pits corresponding to the information signals on the groove for forming a signal surface 112 carrying actual data.

Similarly, a DVD 120 shown in FIG. 1c has a disc substrate 121, from a disc surface 128, and a signal surface on the opposite side with respect to the disc substrate 121. Two types of the DVD, that is a DVD with a single signal surface, termed a single-layer disc, and a DVD with a double signal surface, termed a double-layer disc. FIG. 1c shows an example of the double-layer disc. That is, a first data recording layer is formed by a first signal surface 122 and a first reflective layer 123 associated with the first signal surface 122. A second data recording layer is formed by a second signal surface 124 and a second reflective layer 125 associated with the second signal surface 124. An adhesive surface 126 is formed on the second reflective layer 125 and a dummy substrate 127 is bonded by this adhesive surface 126.

The first reflective layer 123 is a semi-transparent film and is designed to reflect a pre-set proportion of the laser light. Thus, if the laser light is focused on the first signal surface 122, the signals recorded on the first signal surface 122 can be read from the reflected light by the first reflective layer 123, whereas, if the laser light is focused on the second signal surface 124, the laser light is transmitted through the first reflective layer 123 to be converged on the second signal surface 124, such that the signals recorded thereon can be read out from the light reflected by the second reflective layer 125.

In case of the single-layer disc, the signal surface and the reflective layer are formed similarly to the second signal surface 124 and the second reflective layer 125, respectively.

As may be seen from FIGS. 1a, 1b and 1c, the signal surfaces 102 and 112 of the CD 100 and the CD-R 110 are formed at separations close to the disc thickness from the disc surfaces 105, 116. That is, the signal surfaces 102 and 112, on which to focus the laser spot, are separated approximately 1.2 mm from the disc surfaces 105, 116.

On the other hand, the signal surfaces 122 (124) of the DVD 120 are at a mid point of the disc thickness. That is, the signal surfaces 122 and 124, on which to focus the laser spot, are separated approximately 0.6 mm from the disc surface 128. The recording density by pits formed on the signal surfaces 122 (124) is higher than that of the CD 100 and the CD-R 110.

Due to this difference, laser light having a wavelength not larger than 650 nm is used as the playback laser light. In addition, the numerical aperture (NA) of the objective lens is increased to 0.6, while the optical pickup used is optimized for focusing the laser spot at a position separated approximately 0.6 mm from the disc surface 128.

Meanwhile, in a CD/DVD compatible device, it is not impossible to read out the information on the signal surface 102 of the CD 100 by laser light having a wavelength not larger than 650 nm. It is also not impossible to focus the laser spot at a separation approximately 1.2 mm from the disc surface 105 of the CD 100. It is however best to use an optical pickup device having its various characteristics optimized for the CD 100 in view of playback characteristics.

The CD-R 110 also has an organic dye layer 114 which has a dependence on wavelength, such that, if laser light having a wavelength not larger than 650 nm is used, data cannot be reproduced correctly. That is, with the CD-R 110, light absorption of the illuminated laser light of not larger than 650 nm by the organic dye layer 114 is increased to lower the reflectivity. In addition, the modulation factor of the laser light by the pits on the signal surface 112 is lowered. When recording data, pits are formed with the absorptivity and reflectance suited to laser light of wavelength 780 nm, it is not possible to obtain a sufficient modulation factor even if attempts are made to read out the pits by the laser light of other wavelengths.

It is thus desirable to use at least an objective lens and a laser light source dedicated to each optical disc type for an optical disc device which is compatible for the CD 100 (CD-R 110) and the DVD 120.

Thus, the optical disc device of the invention, as now explained, has an optical pickup 1a, dedicated to the CD 100 and the CD-R 110, and an optical pickup 1a, dedicated to the DVD 120. The CD 100, CD-R 110 and the DVD 120 are collectively termed an optical disc D.

Figure 2:
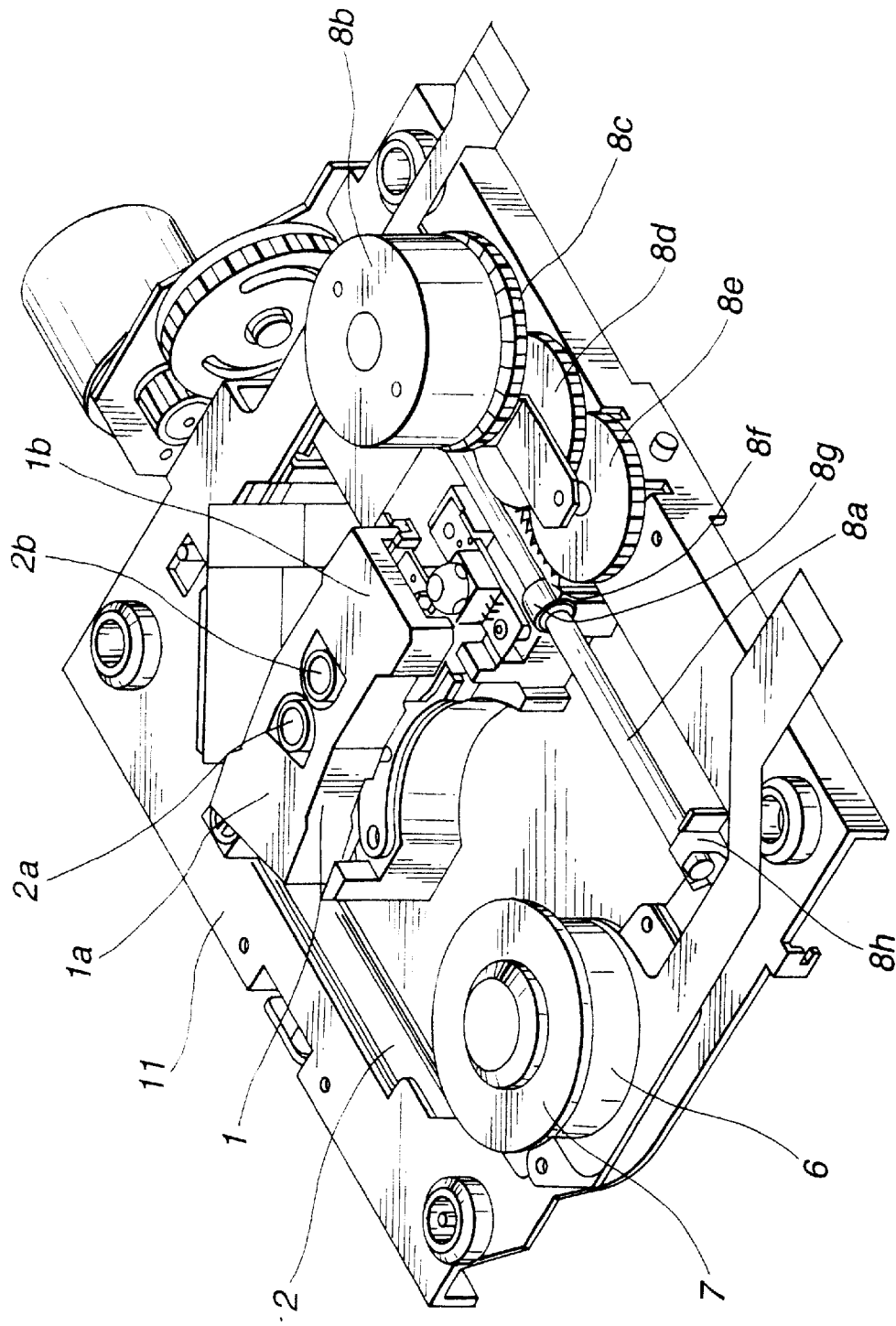
FIG. 2 is a perspective view showing a mechanical deck of the optical disc device.

FIG. 2 shows a perspective view of a playback driving portion (a so-called mechanical deck portion) of the optical disc in the optical disc device.

This mechanical deck includes, on a main body portion of a sub-chassis 11, a variety of units required for reproducing the optical disc. The loaded optical disc D is mounted on a turntable 7 which is driven by a spindle motor 6 for rotating the optical disc.

The optical pickup 1, illuminating the laser light on the rotating optical disc for extracting the information from the reflected light, includes, within its shell, a CD pickup 1a, having an optical system and a laser light source, optimized for the CD 100 (CD-R 110), and a DVD pickup 1b, having an optical system and a laser light source, optimized for the DVD. These pickups 1a, 1b are provided independently of each other. A laser output end of the CD pickup 1a is an objective lens for CD 2a, while a laser output end of the DVD pickup 1b is an objective lens for DVD 2b.

The optical pickup 1 is slidable along the disc radius by a so-called sled mechanism. To this end, a main shaft 8a and a sub-shaft 12 are provided on both sides of the optical pickup 1. The main shaft 8a is passed through a holder 8g of the optical pickup 1, while the sub-shaft 12 is passed through an opposite side holder portion, not shown, so that the optical pickup 1 is movable along the shaft length as the optical pickup 1 is supported by the main shaft 8a and the sub-shaft 12.

As a mechanism for moving the optical pickup 1, a sled motor 8b, and sled transmitting gears 8c, 8d and 8e are provided, while a rack gear 8f is mounted in the vicinity of the holder portion 8g of the optical pickup 1.

When the sled motor 8b is run in rotation, its rotational power is transmitted to the sled transmitting gears 8c, 8d, 8e in this order. Since the thread transmitting gear 8e meshes with the rack gear 8f, the transmitted rotational power causes the optical pickup 1 to be moved along the shaft. Thus, the optical pickup 1 is moved towards the inner and outer disc rim portions by rotation of the sled motor 8b in the forward and reverse directions.

Figure 3:
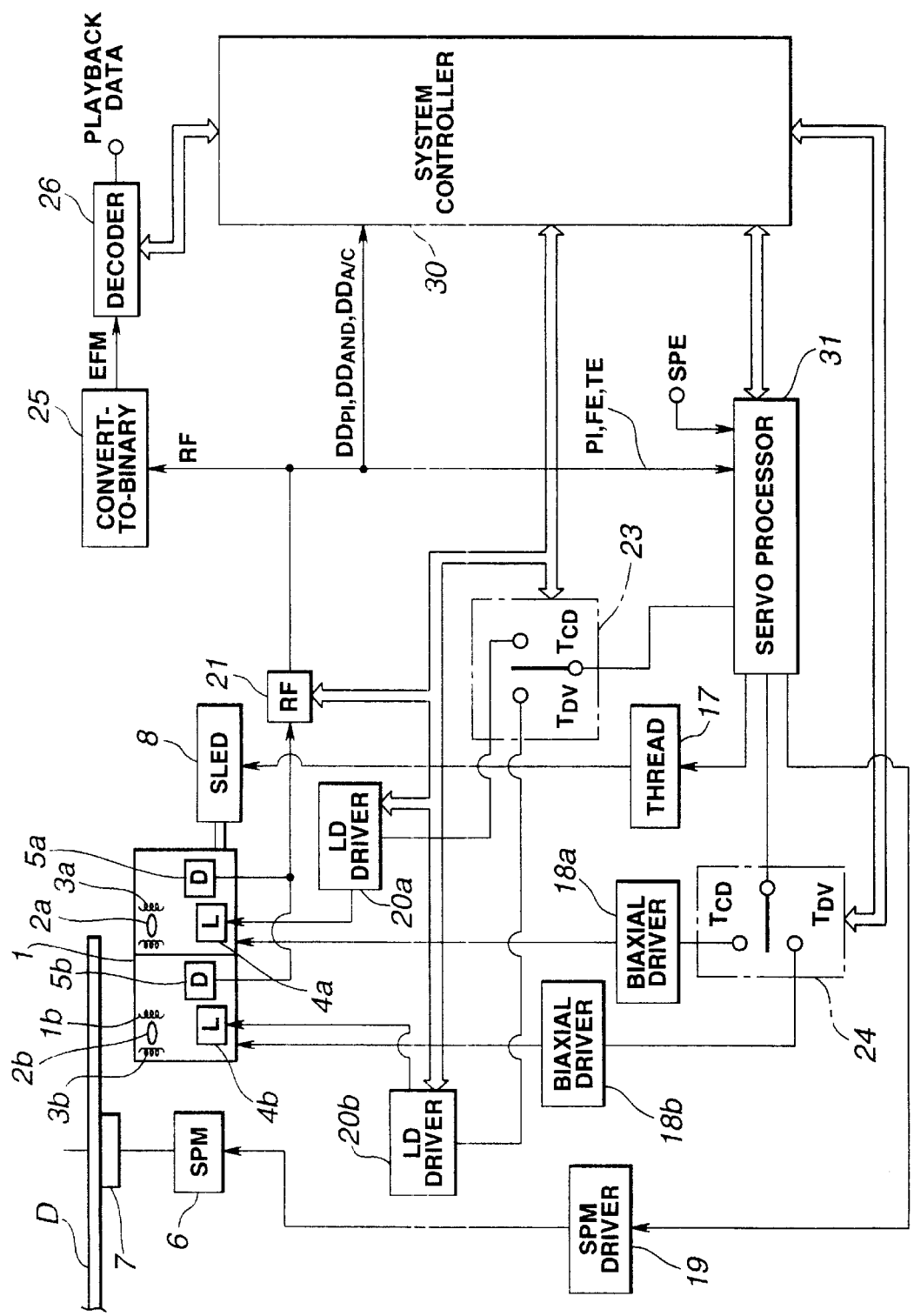
FIG. 3 is a block diagram showing the structure of the optical disc device.

FIG. 3 is a block diagram showing essential portions of the optical disc driving device.

The optical disc D is loaded on the turntable 7, also shown in FIG. 2, and is run in rotation by the spindle motor 6 at CLV or CAV during playback operation.

By the optical pickup 1, data recorded as pits on the optical disc D are read out. In actuality, two independent optical pickups, that is the CD pickup 1a and the DVD pickup 1b, are provided as the optical pickup 1, as discussed previously.

The CD pickup 1a is provided with an optical system suited to the CD 100 and the CD-R 110. A laser diode 4a, operating as a laser light source, has a center output wavelength of 780 nm, with the objective lens for CD 2a having NA=0.45. The objective lens for CD 2a is held by a biaxial mechanism 3a for movement in the tracking direction and in the focusing direction.

The optical pickup for DVD 1b has an optical system optimum for the DVD 120. A laser diode 4b, operating as a laser light source, has a center output wavelength of 650 nm or 635 nm, with the objective lens for DVD 2b having NA=0.6. The objective lens for DVD 2b is held by a biaxial mechanism 3b for movement in the tracking direction and in the focusing direction.

If the optical disc D is the CD 100, the playback operation is performed by the pickup for CD 1a. The reflected light information from the optical disc D is detected by a photodetector 5a and converted into electrical signals corresponding to the received light volume so as to be supplied to a RF block 21.

If the optical disc D is the DVD 120, the playback operation is performed by the pickup for DVD 1b. In this case, the reflected light information from the optical disc D is detected by a photodetector 5b and converted into electrical signals corresponding to the received light volume so as to be supplied to the RF block 21.

Figure 4:
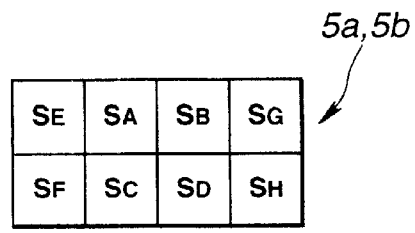
FIG. 4 is a schematic plan view of an eight-segment photodetector of the optical disc device.

The CD pickup and the DVD pickup 1b are provided respectively, as the photodetectors 5a, 5b, with a eight-segment photodetector, made up of four-segment detectors $S_A$, $S_B$, $S_C$ and $S_D$, on either side of which two-segment detectors $S_E$, $S_F$ and two-segment detectors $S_G$, $S_H$ are provided, as shown in FIG. 4.

The RF block 21 includes a current-voltage conversion circuit, an amplifier circuit and a matrix calculation circuit and generates necessary signals based on signals from the photodetectors 5a, 5b. For example, the RF block 21 generates RF signals. As playback signals, focusing error signals FE and tracking servo signals TE for servo control, pull-in signals PI, as so-called sum signals, and disc discrimination signals $DD_{PI}$, $DD_{AND}$ and $DD_{A/D}$.

From detection signals A, B, C and D by the detectors $S_A$, $S_B$, $S_C$ and $S_D$ of the eight-segment photodetector, the RF block 21 generates the focusing error signals FE and the pull-in signal PI by the following equations:

$$FE=(A+C)-(B+D)$$

$$PI=A+C+B+D$$

Figure 5:
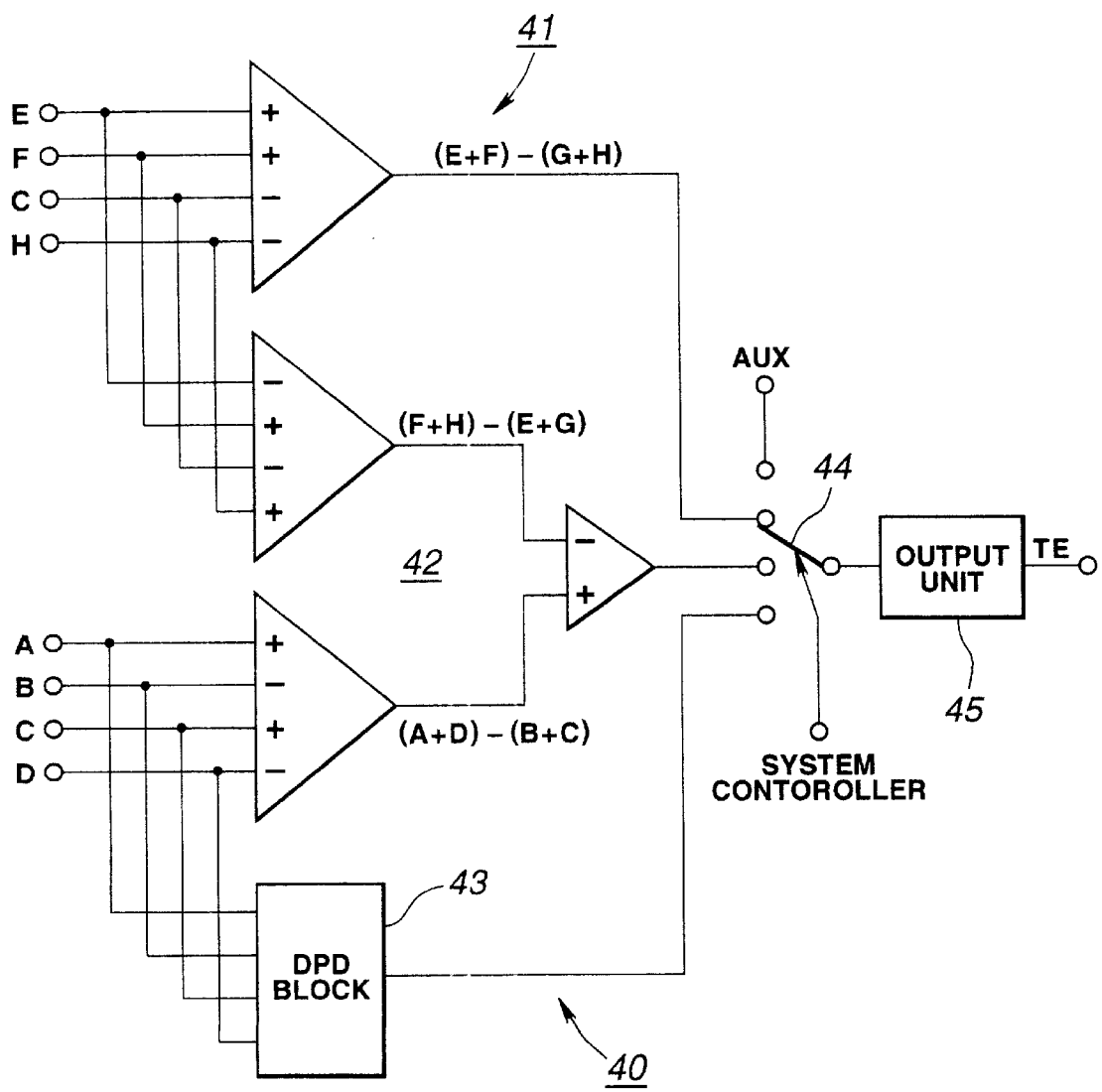
FIG. 5 is a block diagram showing the structure of a tracking block in the optical disc device.

For generating the tracking error signals TE, the RF block 21 has a tracking block 40 configured as shown in FIG. 5.

The tracking block is a block for generating tracking error signals TE from the detection signals A to H of the eight-segment photodetector, and has three tracking error signal generating blocks 41, 42 and 43 for generating three tracking error signals 3SP, DPP and DPD, as shown in FIG. 5. The tracking block selects the three tracking error signals 3SP, DPP or DPD by a changeover switch 44 to output the selected signal via an output unit 45. The changeover switch 44 is a four-input switch and is adapted for selecting an external input signal AUX. The changeover switch 44 is switching-controlled, depending on the type of the optical disc D. The above-mentioned system controller 30 adapted for discriminating the type of the optical disc D based on the disc discrimination signals $DD_{PI}$, $DD_{AND}$ and $DD_{A/D}$.

Specifically, the system controller 30 discriminates between the CD 100 (CD-R 110) and the DVD 120, having different disc substrate thicknesses, based on the disc discrimination signal $DD_{PI}$, while discriminating between the DVD 120 and a DVD-RW 130, as later explained, by different reflectivities, based on the disc discrimination signal $DD_{A/D}$. If, as a result of discrimination, the optical disc D loaded on the turntable 7 is the CD 100 or the CD-R 110, the system controller 30 switching-controls the changeover switch 44 such as to output tracking error signals 3SP. If the disc D is the DVD 120, the system controller 30 switching-controls the changeover switch 44 such as to output tracking error signals DPD, whereas, if the disc D is the DVD-RW 130, the system controller 30 switching-controls the changeover switch 44 such as to output tracking error signals DPP.

In the tracking block 40, the first tracking error signal generating block 41 generates three-spot type tracking error signals 3SP in accordance with the equation:

$$3SP=(E+F)-(G+H)$$

That is, the first tracking error signal generating block 41 generates a difference signal between a sum signal of detection signals E and F of detectors $S_E$ and $S_F$ and a sum signal of detection signals G and H of detectors $S_G$ and $S_H$. The detectors $S_E$ and $S_F$ and the detectors $S_G$ and $S_H$ are arranged on both sides of the detectors $S_A$ to $S_D$, arranged at the center of the eight-segment photodetector 5a, 5b, as discussed previously.

The present system is a generic detection system for detecting tracking errors during reproduction of a laser beam spot for the recording track generated on the signal surface of the optical disc having a thickness of approximately 1.2 mm, that is the CD 100 or the CD-R 110.

On the other hand, the second tracking error signal generating block 42 generates tracking error signals DPP of the differential push-pull system in accordance with the equation:

$$DPP=\{(A+D)-(B+C)\}-\{(F+H)-(E+G)\}$$

The present system is a detection system used for recording/reproducing an optical disc DVD-RW (Rewritable) which is a rewritable recording medium, now being researched, pursuant to the DVD standard. The physical structure of the DVD-RW 130 is hereinafter explained with reference to FIGS. 6a and 6b.

Figure 6A:
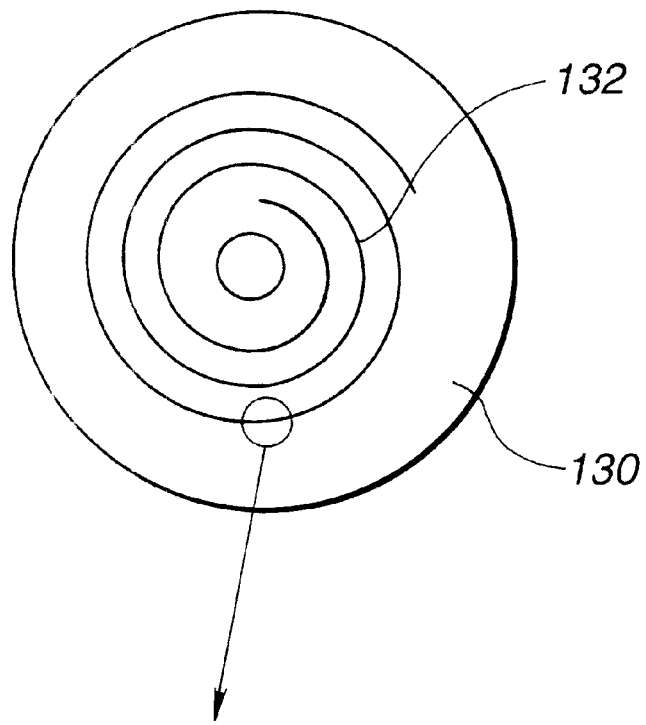
FIGS. 6A and 6B illustrate the physical structure of a DVD-RW disc associated with the optical disc device.

Similarly to the DVD 120, the DVD-RW 130 has a signal surface formed at a spacing of approximately 0.6 mm from the disc surface. In a recordable area of the instant embodiment of the DVD-RW 130 is pre-formed a tracking pre-groove 132 extending spirally from the inner rim to the outer rim, as shown in FIG. 6a.

Figure 6B:
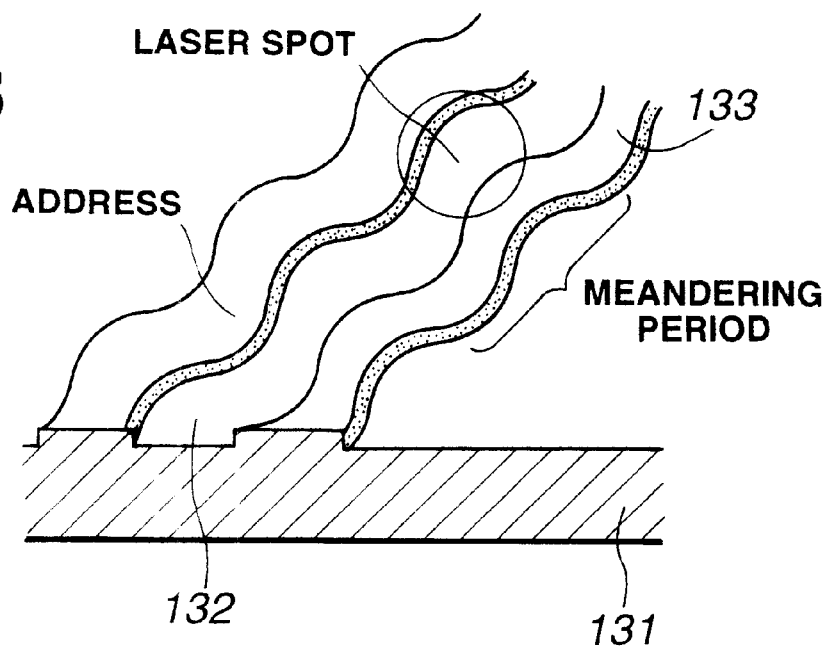

This pre-groove 132 is formed on a disc substrate 131, and has its left and right sidewall portions meandering at a pre-set period in meeting with the address information, as shown in FIG. 6b showing part of the pre-groove on an enlarged scale. That is, the pre-groove 132 is meandering at a pre-set period corresponding to wobbling signals generated on the basis of the addresses. The area confined between neighboring pre-grooves 132 is a land 133. The surface of the disc substrate 131 formed with the pre-groove 132 and the land 133 is coated with a phase-transition recording film, as a recording layer, having its reflectivity changed depending on the crystallized state. Data are recorded on the pre-groove 132 as the recording track.

In recording/reproducing the data on or from the DVD-RW 130, the DVD pickup 1b generates three light beams by a diffraction lattice and arrays both side beam spots on the recording surface of the optical disc with an offset of one-half the track pitch along the disc radius relative to the mean beam spot. The reflected light of the main beam is detected by the split detectors $S_A$, $S_B$, $S_C$ and $S_D$ of the eight-segment photodetector shown in FIG. 4 so as to be output as detection signals A to D. On the other hand, the reflected light of the side beams is detected by the split detectors $S_E$, $S_F$ and the split detectors $S_G$ and $S_H$ so as to be output as detection signals E to H. The above-mentioned calculations are executed on the detection signals A to H detected by the detectors $S_A$ to $S_H$ for producing the tracking error signals DPP of the differential push-pull system. The tracking error signals DPP are freed of offset components applied by objective lens movement on tracking error signals of the conventional push-pull system.

Figure 7:
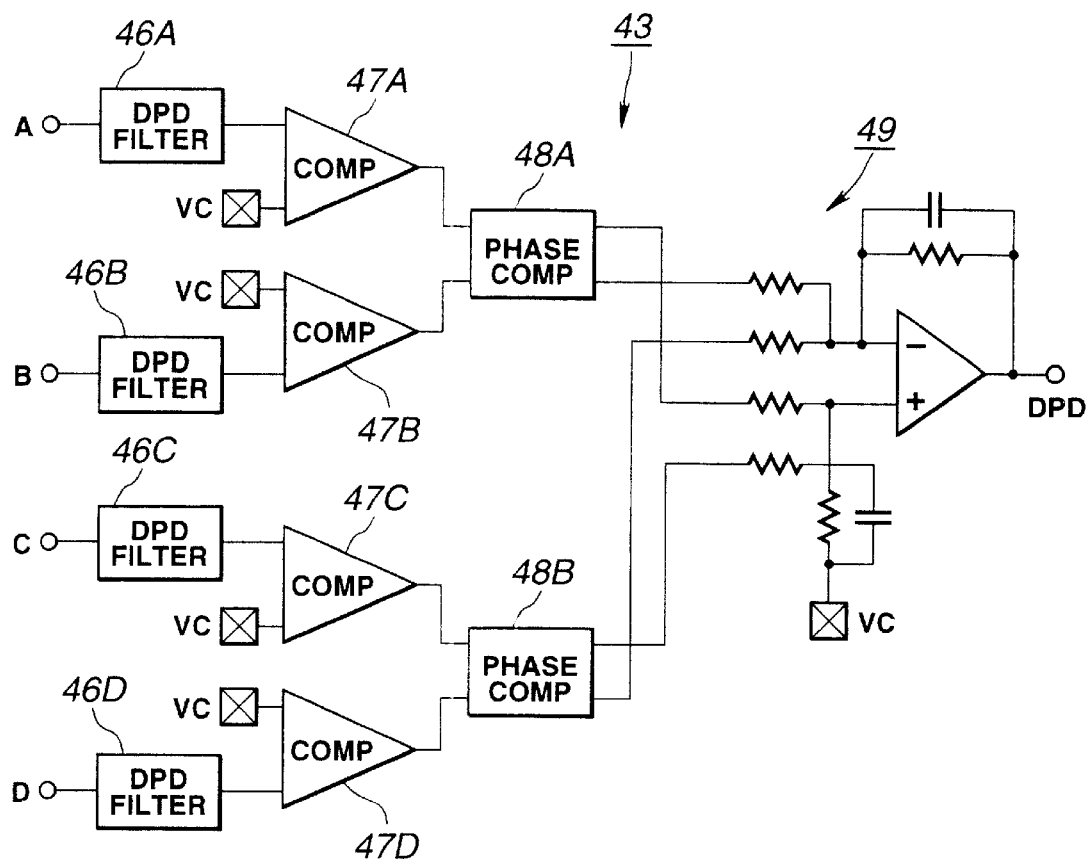
FIG. 7 is a block diagram showing the structure of a third tracking error signal generating block in the tracking block.
Figure 8:
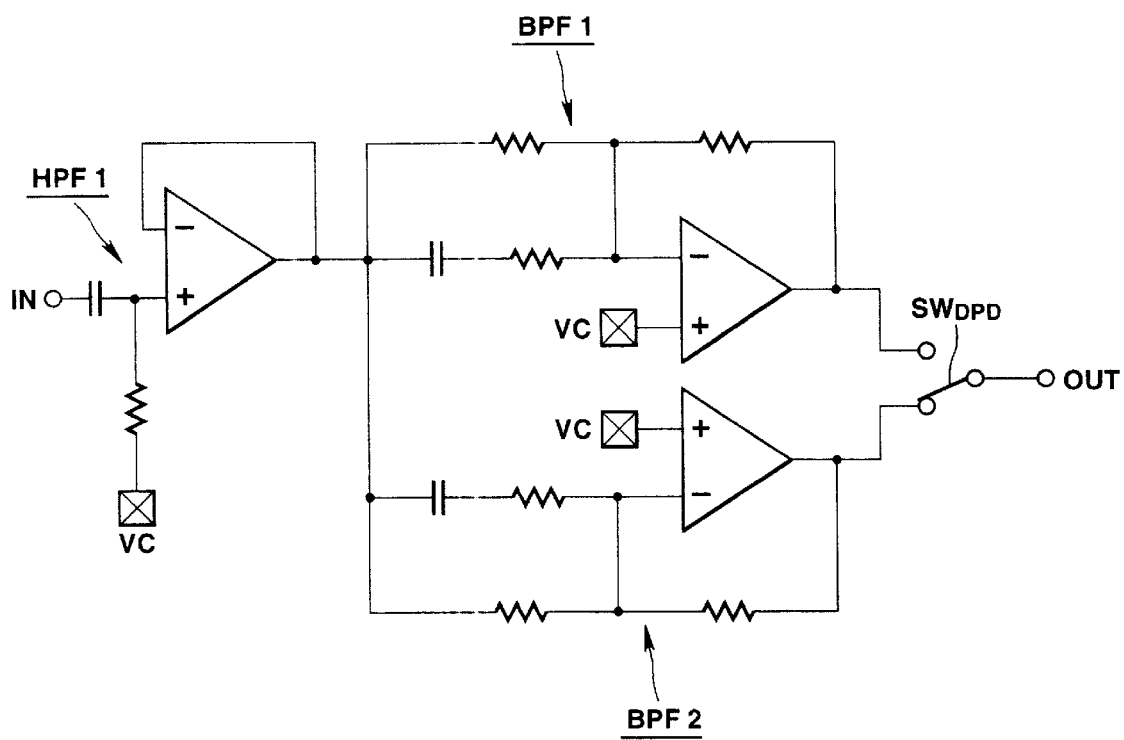
FIG. 8 is a circuit diagram showing the structure of a DPD filter in the third tracking error signal generating block in the tracking block.

In addition, the third tracking error signal generating block 43 is configured as shown in FIG. 7 for generating the tracking error signal DPD of the differential phase detection (DPD) system from the detection signals A, B, C and D of the detection signals A to H of the eight-segment photodetector.

The present system is a tracking error detection system for an optical disc, such as an optical disc having a thickness of approximately 0.6 mm, higher in recording density than the CD 100.

That is, the third tracking error signal generating block 43 includes DPD filters 46A, 46B, 46C and 46D, supplied with the detection signals A to D of the detection signals A to H of the eight-segment photodetector detected by the four central detectors $S_A$, $S_B$, $S_C$ and $S_D$ of the photodetector detecting the reflected light of the main beam, and level comparators 47A, 47B, 47C and 47D supplied with the detection signals A to C bandwidth-limited by the DPD filters 46A to 46D, respectively. The third tracking error signal generating block 43 also includes phase comparators 48A, 48B supplied with output signals of the level comparators 47A, 47B, 47C and 47D and an integration circuit 49 supplied with output signals of the phase comparators 48A, 48B.

In the third tracking error signal generating block 43, the level comparators 47A, 47B, 47C and 47D compare the detection signals A to D, entered via DPD filters 46A, 46B, 46C and 46D, to a pre-set level VC, for converting the detection signals A to D to binary-valued signals. The phase comparators 48A, 48B phase-compare the binary-valued detection signals A to D. The maximum operating frequency of the phase comparators 48A, 48B is 10 MHZ. The integrating circuit 49 integrates the output signals of the phase comparators 48A, 48B with 30 kHz for outputting the tracking error signals DVD.

Figure 9:
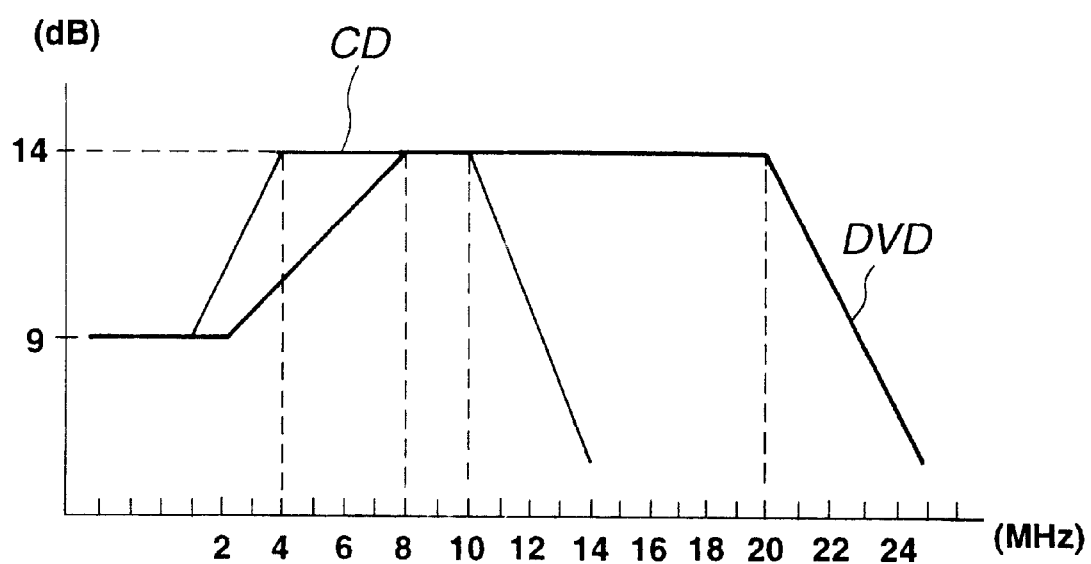
FIG. 9 is a graph showing the frequency response of the DPD filter.

The DPD filters 46A, 46B, 46C and 46D of input units of the third tracking error signal generating block 43 are each made up of a high-pass filter HPF1 for cutting dc components, two band-pass filters BPF1, BPF2 for amplifying EFM+ signal components and an output selection switch $SW_{DPD}$ for selecting the band-pass filters BPF1, BPF2. The frequency response can be changed over by selecting one of the two band-pass filters BPF1, BPF2 by the output selection switch $SW_{DPD}$, as shown in FIG. 9.

The output selection switch $SW_{DPD}$ is switching-controlled, depending on the type of the optical disc 30, by the above system controller 30 which discriminates the type of the optical disc D based on the above disc discrimination signals $DD_{PI}$, $DD_{AND}$ and $DD_{A/D}$.

That is, the system controller 30 discriminates between the CD 100 and the DVD 120, by the disc discrimination signals $DD_{PI}$, as later explained, and changes over the output selection switch $SW_{DPD}$ for selecting the band-pass filter BPF2 having a passband on a higher side than the band-pass filter SPF1 if the disc is the DVD 120.

Figure 10:
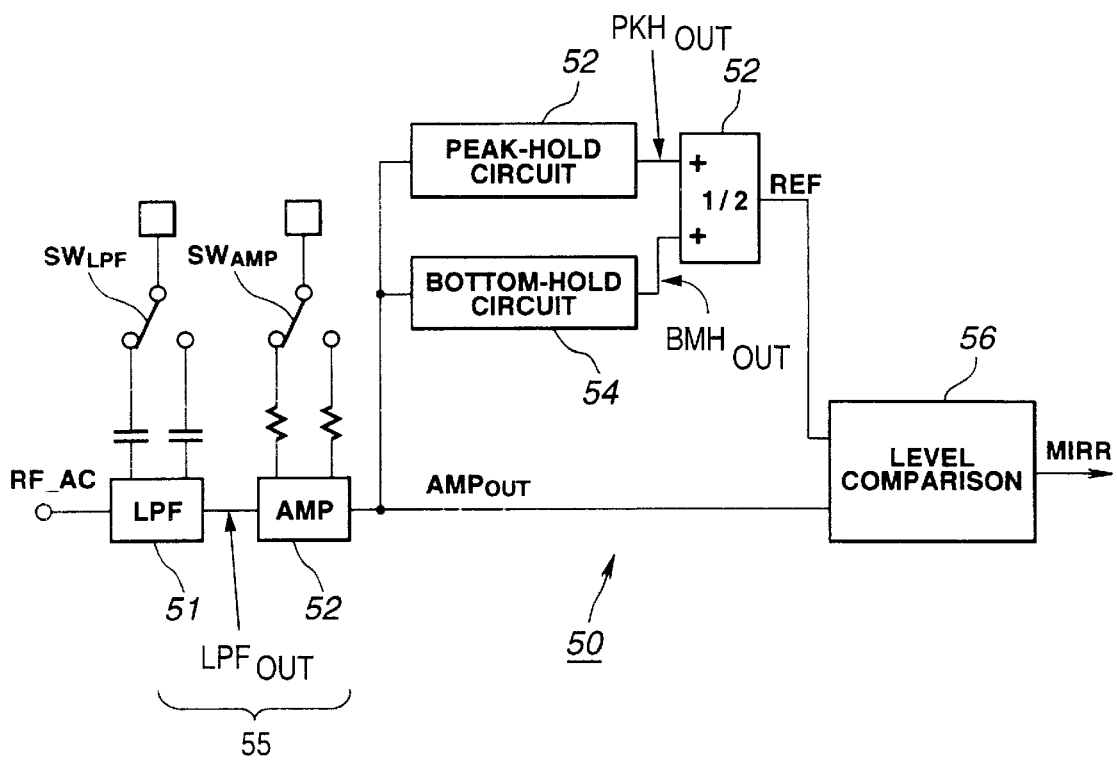
FIG. 10 is a block diagram showing the structure of a mirror block in the optical disc device.

The RF block 21 generates a mirror signal MIRR by a mirror block 50 configured as shown in FIG. 10.

This mirror block 50 includes a low-pass filter 51, provides as an input unit supplied with a RF signal RF_AC, obtained as a detection signal by the photodetectors 5a, 5b, and an amplifier circuit 52 supplied with an output signal $LPF_{OUT}$ of the low-pass filter 51. The mirror block 50 also includes a peak-holding circuit 53 and a bottom-holding circuit 54, supplied with an output signal $AMP_{OUT}$ of the amplifier circuit 52. The mirror block 50 also includes a reference level signal generating circuit 55 supplied with output signals $PKH_{OUT}$ and $BMH_{OUT}$ of the peak-holding circuit 53 and the bottom-holding circuit 54. The mirror block 50 further includes a level comparator circuit 56 supplied with a reference level signal REF from a reference level signal generating circuit 55.

Figures 11A, 11B, 11C, 11D:
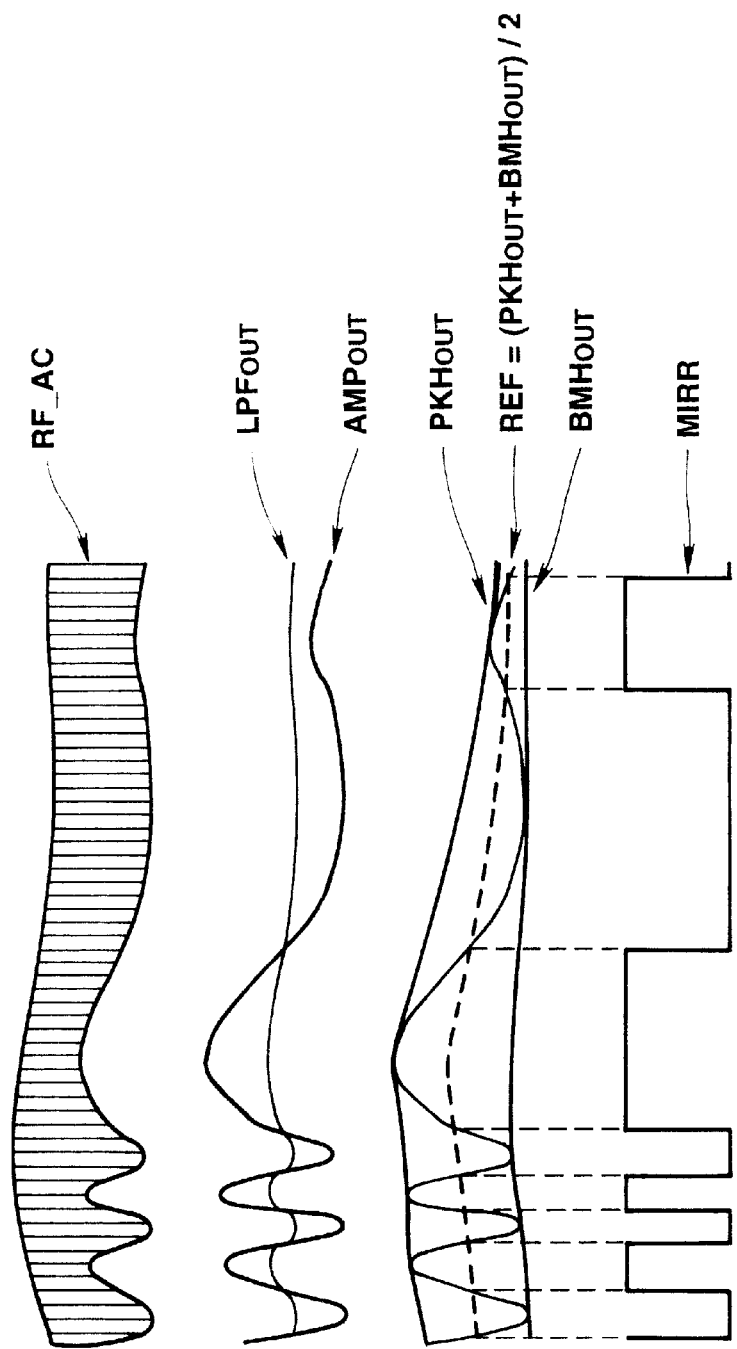
FIGS. 11A–11D are waveform diagrams for illustrating the operation of the mirror block.

In this mirror block 50, the low-pass filter 51 is used for extracting a traversing signal from the RF_AC shown in FIG. 11a and has its cut-off frequency changed over between 60 kHz and 30 kHz by a switch SWLPF which is switching-controlled by the system controller 30 depending on the type of the optical disc D.

That is, the system controller 30 discriminates the type of the optical disc D, by the method as later explained, based on the disc discrimination signals $DD_{PI}$, for changing over the switch SWLPF to 60 kHz or to 30 kHz for the DVD 120 and for the CD 100, respectively.

On the other hand, the amplifier circuit 52 is used for amplifying the output signal $LPF_{OUT}$ of the low-pass filter 51, that is the traversing signal, and has its gain changed over between 12 dB and 2 dB by the switch SWAMP, which is switching-controlled by the system controller 30 depending on the type of the optical disc D.

This switching is done for coping with recently developed rewritable optical discs CD-RW or DVD-RW, employing a phase transition recording film. Specifically, the reflectivity of the optical disc is detected by the disc discrimination signals $DD_{A/D}$ and the switch SWAMP is changed over to raise the gain to 12 dB for reproducing the disc having a reflectivity of ¼ to ⅕ of the reflectivity of the CD 100.

Further, the peak-holding circuit 53 holds the peak level of the output signal $AMP_{OUT}$ of the amplifier circuit 52 and feeds the output signal $PKH_{OUT}$ to the reference level signal generating circuit 55. Also, the bottom-holding circuit 54 holds the bottom level of the output signal $AMP_{out}$ and feeds the output signal $BMH_{out}$ to the circuit 55. The peak-holding circuit 53 and the bottom-holding circuit 54 are configured for setting time constants in 32 steps by the system controller 30 responsive to the spindle speed or the traversing speed.

On the other hand, the reference level signal generating circuit 55 generates a reference signal REF, having a signal level intermediate between the output signals $PKH_{OUT}$ of the peak-holding circuit 53 and $BMH_{OUT}$ of the bottom-holding circuit 54, from these output signals $PKH_{OUT}$ and $BMH_{OUT}$, in accordance with the equation:

$$REF=(PKH_{OUT}+BMH_{OUT})/2.$$

The level comparator circuit 56 compares the output signal $AMP_{OUT}$ of the amplifier circuit 52, that is the amplified traversing signal, to the reference level signal REF from the reference level signal generating circuit 55, as to the signal level, and generates a mirror signal MIRR shown in FIG. 11d.

Figure 12:
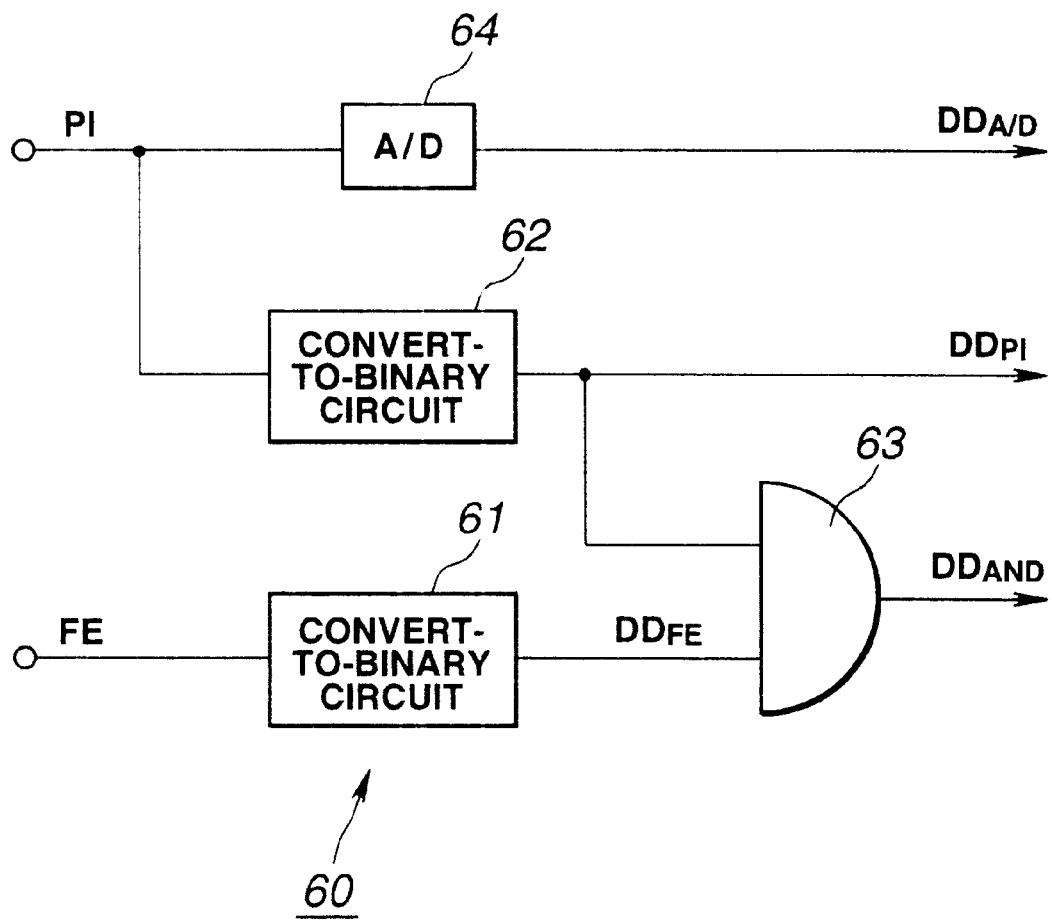
FIG. 12 is a block diagram showing the structure of a discrimination signal generating block in the optical disc device.

Also, the RF block 21 generates disc discrimination signals $DD_{PI}$, $DD_{AND}$ and $DD_{A/D}$ by a discrimination signal generating block 60 configured as shown in FIG. 12.

This discrimination signal generating block 60 includes convert-to-binary circuits 61, 62 for converting the focusing error signal FE=(A+C)+(B+D) and the pull-in signal PI=A+C+B+D, generated from the detection signals A, B, C and D by the detectors $S_A$ to $S_D$ of the eight-segment photodetector, into binary signals. The discrimination signal generating block 60 also includes an AND gate 63 for finding the logical product of output signals $DD_{FE}$ and $DD_{PI}$ of the convert-to-binary circuits 61, 62 and an A/D converter 64 for converting the signal level of the pull-in signal PI into digital data. The output signal $DD_{PI}$ of the convert-to-binary circuit 62, the logical product signal $DD_{AND}$ from the AND gate 63 and the output signal $DD_{A/D}$ of the A/D converter 64 are routed as disc discrimination signals to the system controller 30.

The signals generated by the RF block 21 are routed to a convert-to-binary circuit 25, a servo processor 31 and a discrimination signal generating circuit 27. That is, the playback RF signals from the RF block 21 are routed to the convert-to-binary circuit 25, while the focusing error signals FE, tracking error signals TE and the pull-in signals PI are routed to the servo processor 31, and the disc discrimination signals $DD_{PI}$, $DD_{AND}$ and $DD_{A/D}$ are routed to the system controller 30.

The playback RF signals, obtained by the RF block 21, are processed by the convert-to-binary circuit 25 for conversion to so-called eight-to-fourteen modulation signals (EFM signals) in case of the CD or to EFM+ signals in case of the DVD. The converted signals are routed to a decoder 26. The decoder 26 executes EFM demodulation or CIRC decoding and, if need be, CD-ROM decoding or MPEG decoding for the information read out from the optical disc D.

The servo processor 31 generates various servo signals, such as focusing, tracking, sled or spindle servo drive signals, from the focusing error signals FE and tracking error signals TE from the RF block 21, and from spindle error signals SPE from the system controller 30 for executing the servo operations.

That is, the focusing drive signals or tracking drive signals are generated, responsive to the focusing error signals FE and tracking error signals TE, so as to be output at the switch 24. If the optical disc D is the CD 100 or DVD 120, a terminal $T_{CD}$ or a terminal $T_{DV}$ of the switch 24 is selected, respectively.

During reproduction of the CD 100, the focusing drive signals and the tracking drive signals generated responsive to the focusing error signals FE and the tracking error signals TE from the RF block 21 are routed to a biaxial driver 18*a* which then drives the biaxial mechanism 3*a* of the CD pickup 1*a*. This completes a tracking servo loop and the focusing servo loop by the CD pickup 1*a*, RF block 21*a*, servo processor 31 and the biaxial driver 18*a*.

During reproduction of the DVD 120, the focusing drive signals and the tracking drive signals generated responsive to the focusing error signals FE and the tracking error signals TE from the RF block 21 by the servo processor 31 are routed to a biaxial driver 18*b* which then drives the biaxial mechanism 3*b* of the DVD pickup 1*b*. This completes a focusing servo loop and a tracking servo loop by the DVD pickup 1*b*, RF block 21*b*, servo processor 31 and the biaxial driver 18*b*.

The servo processor 31 routes to a spindle motor driver 19 a spindle drive signal generated responsive to a spindle error signal SPE. The spindle motor driver 19 is responsive to the spindle drive signal to apply a three-phase drive signal to the spindle motor 6 to cause the CLV rotation of the spindle motor 6. The servo processor 31 is responsive to the spindle kick/brake control signals from the system controller 30 to start or stop the spindle motor 6 by the spindle motor driver 19.

The servo processor 31 generates a sled drive signal, based on the sled error signal produced from the tracking error signals TE or the accessing execution control from the system controller 30 for supplying the generated sled drive signal to a sled driver 17. The sled driver 17 is responsive to the accessing execution control to drive a sled mechanism 8. This sled mechanism 8 is made up of the main shaft 8*a*, sled motor 8*b* and the sled transmission gears 8*c*, 8*d* and 8*e*, shown in FIG. 2, such that optimum sliding movement of the optical pickup 1 occurs by the thread driver 17 driving the sled motor 8*b* responsive to the sled drive signal.

A laser diode 4*a* in the CD pickup 1*a* is driven by a laser driver 20*a*. On the other hand, a laser diode 4*b* in the DVD pickup 1*b* is driven by a laser driver 20*b*.

Figure 13:
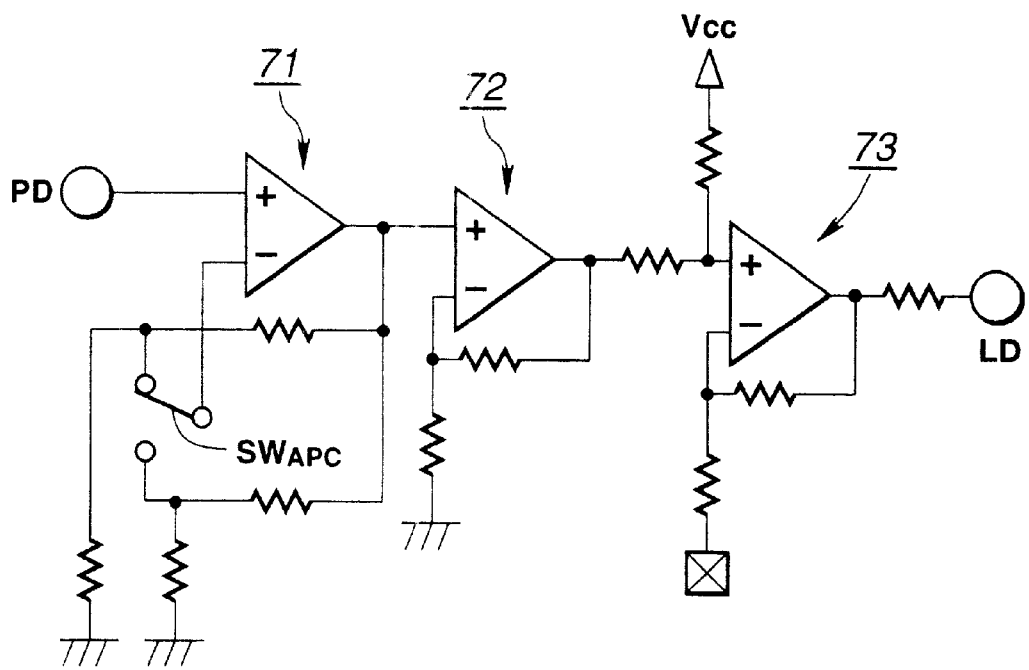
FIG. 13 is a circuit diagram showing the structure of an APC circuit in the optical disc device.
Figure 14:
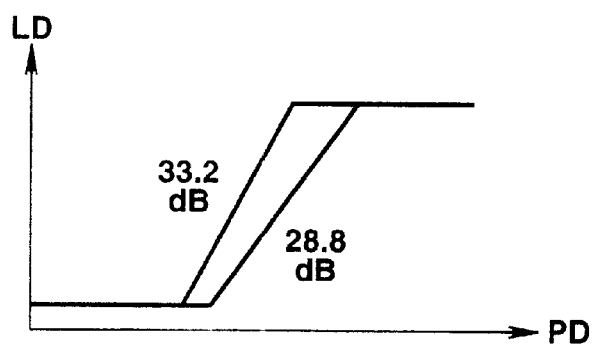
FIG. 14 is a graph showing gain characteristics of the APC circuit.

The laser drivers 20*a*, 20*b* have enclosed therein an automatic power control circuit (APC) for controlling the laser outputs of the laser diodes 4*a*, 4*b* so that a detection output of a front monitor photodiode PD adapted for detecting the light volume of the laser light radiated from the laser diodes 4*a*, 4*b* will be constant. The APC circuit is made up of, for example, three stages of amplifier circuits 71, 72 and 73, as shown in FIG. 13. The APC circuit operates for amplifying a detection output of the front monitor photodiode PD by the first-stage amplifier circuit 71 and the next-stage amplifier circuit 72 for feeding back the amplified output to the output stage amplifier circuit 73 driving the laser diode LD for driving-control of the laser diode LD so that the detection output of the front monitor photodiode PD will be constant. This APC circuit has, in its initial-stage amplifier circuit 71, a gain-switching switch $SW_{APC}$ which is adapted for switching/setting the closed loop gain of the APC circuit between 33.2 dB and 28.8 dB as shown in FIG. 14. The switch $SW_{APC}$ is switching-controlled by the system controller 30 depending on the type of the optical disc D.

Specifically, the system controller 30 discriminates, based on the disc discrimination signals $DD_{PI}$, $DD_{AND}$ or digitized focusing error signals $DD_{FE}$, as later explained, whether the optical disc D is a single-layer disc or a double-layer disc.

If the disc D is a double-layer disc lower in reflectivity than the single layer disc, the system controller 30 causes the changeover switch $SW_{APC}$ to be changed over so that the closed-loop gain of the APC circuit will be equal to 28.8 dB. This increases the output of the laser diode 4*b*. Conversely, the single-layer disc is higher in reflectivity than the double-layer disc, such that the system controller 30 causes the changeover switch $SW_{APC}$ to be changed over so that the closed-loop gain of the APC circuit will be equal to 33.2 dB to lower the output of the laser diode 4*b*.

If, in the case of the double layer disc, the modulated data (eight-to-sixteen modulated signal) is demodulated by the decoder 26, the system controller 30 judges, based on the discriminating signal recorded on the signal surface of each signal recording layer, whether data being reproduced is data recorded on the first signal surface 122 or that receded on the second signal surface 123. The second signal surface 124, that is the signal surface separated from the disc surface 128, has a reflectivity lower than that of the first signal surface 122 because the laser light is illuminated on the second signal surface 124 via the first signal surface 122. Thus, if the playback signal surface is the second signal surface 124, the system controller 30 lowers the closed-loop gain to a value lower than that for the first signal surface 122, while raising the output of the laser diode 4*b*. Thus, gain control adapted to each signal recording layer leads to further stabilized signal reproduction.

The servo processor 31 generates a laser driving signal for effectuating laser light emission of the optical pickup 1 during reproduction under instructions from the system controller 30 to route the generated laser driving signal to the switch 23. The switch 23 has its terminal $T_{CD}$ and its terminal $T_{DV}$ selected if the optical disc D is the CD 100 or the DVD 120, respectively. Thus, the laser diode 4*a* or 4*b* emits light depending on the type of the optical disc D to be reproduced.

The above-described servo or decoding operations are controlled by the system controller 30 comprised of, for example, a micro-computer.

The operations of start or termination of reproduction track accessing, fast feed reproduction or rewind reproduction can be realized by controlling the operation of the servo processor 31 or the optical pickup 1 by the system controller 30.

This optical disc can cope with both the CD 100 and the DVD 120, and the optical pickup 1*a* or 1*b*, RF block 21*a* or 21*b*, laser driver 20*a*, 20*b* and the biaxial driver 18*a* or 18*b* are provided for devoted use with the CD 100 or the DVD 120, respectively. Thus, for properly exploiting these devoted circuit systems, it is judged whether the optical disc D is the CD 100 or the DVD 120, when the optical disc is loaded in position, for setting to one of the terminals $T_{CD}$ or $T_{DV}$ of each of the switches 22 to 24 under control by the system controller 30.

Among the optical discs D handled by the present optical disc device, the CD 100 and the DVD 120 have signal surfaces 102 and 112 at a separation of approximately 1.2 mm from the disc surfaces 105 and 116, respectively. On the other hand, the DVD 120 has the signal surface 122 at a separation of approximately 0.6 mm from the disc surface 128.

For explanation sake, the CD 100 and the CD-R 110 are termed a 1.2 mm single-plate disc, while the DVD 120 is termed a 0.6 mm laminated disc.

Figure 15:
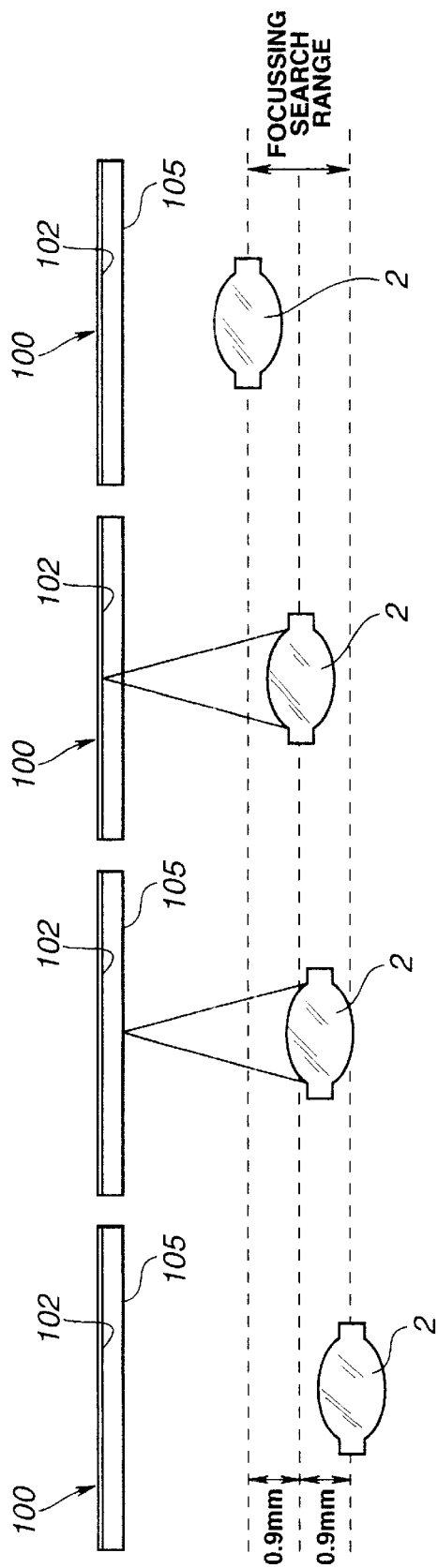
FIGS. 15A–15D show the relative positions between a CD and an objective lens for illustrating the operating principle of disc discrimination in the optical disc device.

The objective lens 2*a* of the CD pickup 1*a* is moved, by focusing servo operation, in a direction towards and away from the CD 100 so that the laser light will be focused on the signal surface 102 of the CD 100 (1.2 mm single-plate disc) as shown in FIG. 15c.

If focusing servo control is executed directly after loading of the optical disc D, such as the CD 100 or the DVD 120, the objective lens 2a first is compulsorily moved within the focusing search range for detecting focusing pull-in range corresponding to the linear area of a S-shaped curve. If the focusing servo loop is turned on with the objective lens 2a in the focusing pull-in range, focusing servo control is subsequently executed for convergence to the just-focus state.

These focusing search and focusing servo operations hold for a DVD optical pickup 1b associated with the DVD 120.

It should be noted that the just-focus point is a point of focusing of the laser light on the signal surface 122 of the DVD 120, which is the 0.6 mm-laminated disc, as shown in FIG. 12c, and differs from the CD 100 as a position along the disc thickness.

Figure 16:
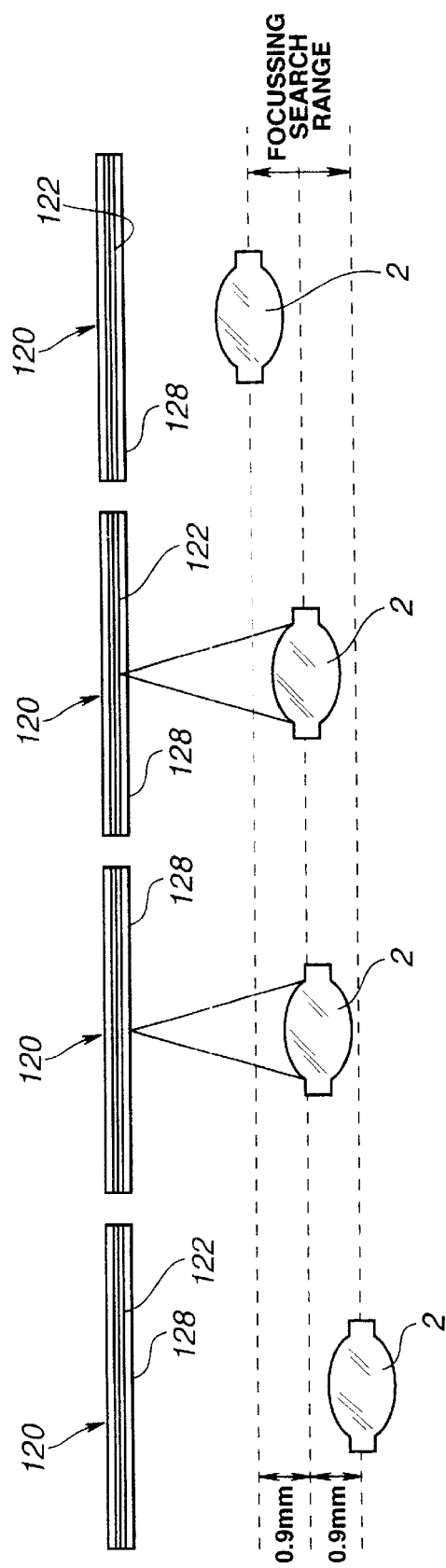
FIGS. 16A–16D show the relative positions between a DVD and an objective lens for illustrating the operating principle of disc discrimination.

For both the objective lens for CD 2a and the objective lens for DVD 2b, the focusing search range is from the bottom position of FIGS. 15a and 16a as far as the top position of FIGS. 15d and 16d. If the position of the just-focus state of FIGS. 15c and 16c is the initial reference position, the focusing search range is ±0.9 mm.

If the objective lens 2 (objective lens 2a for CD and objective lens 2b for DVD) can be varied in its position state relative to the CD 100 or the DVD 120, as shown in FIGS. 15a to 15d or FIGS. 16a to 16d, the focusing error signals FE or the pull-in signals PI associated with the respective positions can be obtained as reflected light information data from the optical disc D.

In the vicinity of the just-focus point as shown in FIGS. 15c and 16c, the reflected light is detected at an optimum level, a S-shaped curve is observed as the focusing error signals FE, while the amplitude level is increased for the pull-in signal PI. In an assumed state of FIGS. 15b or 16b in which the light is focused on the disc surfaces 105, 128, the reflected light is detected on the disc surfaces 105, 128, albeit at a low reflectivity. Thus, a small S-curve is observed as the focusing error signals FE, while a small amplitude level is observed as the pull-in signal PI.

Thus, the system controller 30 discriminates the type of the disc D for setting a parameter suited to the type of the optical disc D, based on the disc discrimination signals $DD_{AND}$, obtained by an AND gate 63 finding the logical product of output signals $DD_{FE}$ and $DD_{PI}$ of the convert-to-binary circuits 61, 62, output signal $DD_{PI}$ of the convert-to-binary circuits 62 and the disc discrimination signals $DD_{A/D}$ corresponding to the digitized signal level of the pull-in signal PI by the A/D converter 64. The convert-to-binary circuits 61 and 62 convert the focusing error signals FE=(A+C)−(B+D) and the pull-in signal PI=A+C+B+D, generated from the detection signals A, B, C and D by the detectors $S_A$, $S_B$, $S_C$ and $S_D$ of the eight-segment photodetector into binary-valued signals.

For example, as the objective lens 2 is compulsorily moved as in a focusing search, the amplitude obtained on the signal surface of the optical disc D with the pull-in signal PI and the amplitude obtained on the disc surface are compared to each other, and the time of both amplitudes is measured for discriminating whether the optical disc D is the CD 100 or the DVD 120. That is, since the separation from the disc surface 105 to the disc surface 102 of the 1.2 mm single-plate disc is approximately 1.2 mm, whereas the separation from the disc surface 128 to the disc surface 122 of the 0.6 mm laminated disc is approximately 0.6 mm, the time lag between the timing of just-focusing on the disc surface to give an amplitude and the timing of just-focusing on the signal surface to give an amplitude differs between the 1.2 mm single-plate disc and the 0.6 mm laminated disc. This can be utilized for disc discrimination from, for example, the pull-in signal, as discussed in U.S. patent application Ser. No. 08/915,877 (filed on Aug. 21, 1997).

Similar discrimination can be made using the focusing error signals FE. In the present instance, the following disc discrimination operation is performed, using the binary-valued disc discrimination signals $DD_{PI}$ converted from the pull-in signal PI by the above-mentioned convert-to-binary circuits 62.

Figure 17:
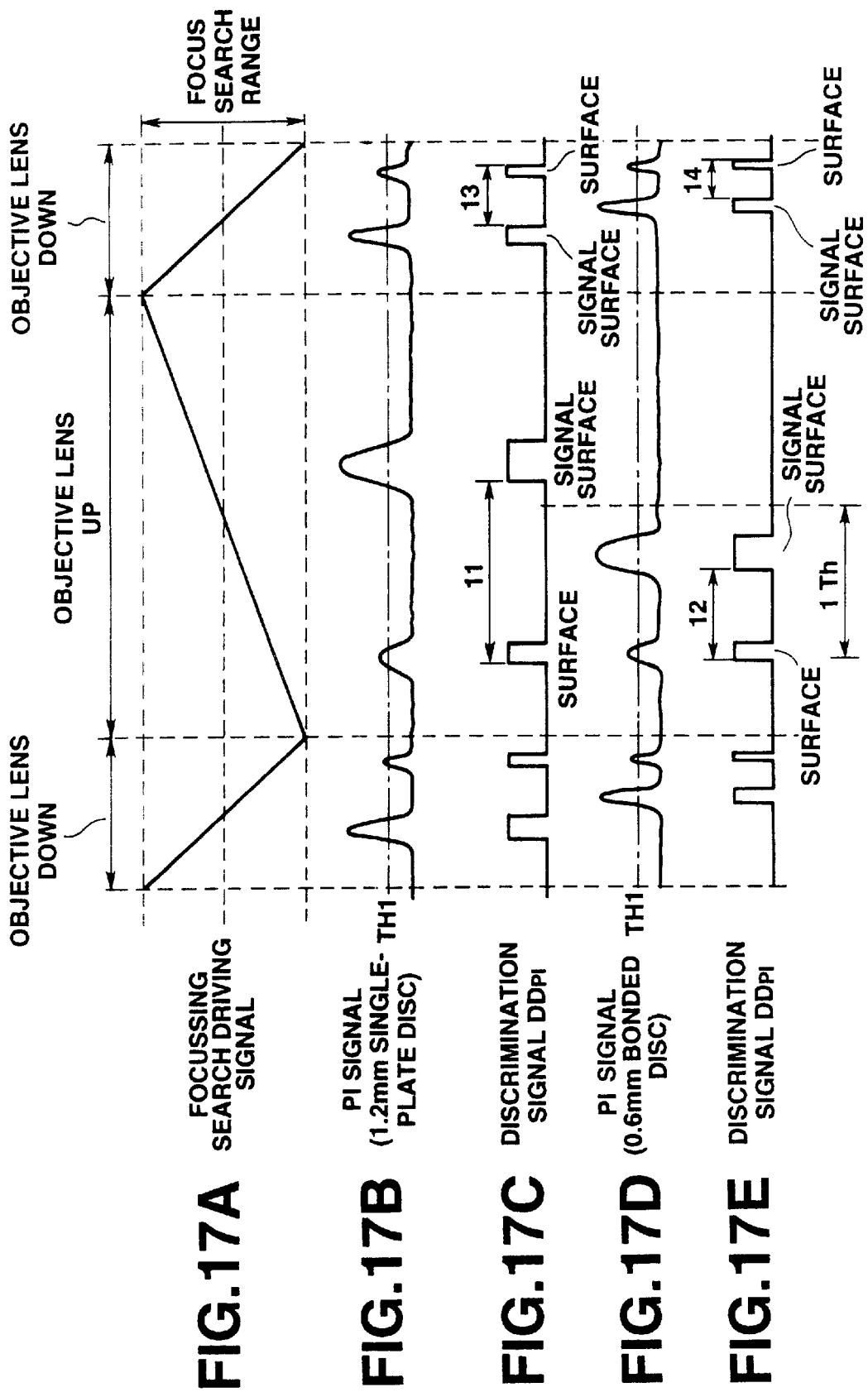
FIGS. 17A–17E are waveform diagrams of various signals for illustrating the operating principle of disc discrimination.

The system controller 30 commands the servo processor 31 to effect the driving of the objective lens 2 similar to that for focusing search. The servo processor 31 is responsive thereto to route to the biaxial drivers 18a, 18b a signal shown in FIG. 17a as a focusing search drive signal.

In the present instance, each switch 23, 24 has its terminal $T_{DV}$ connected in circuit such that the operation for disc discrimination occurs using the DVD pickup 1b. To this end, the biaxial driver 18b drives the biaxial driver 3b by the focusing search drive signal as shown in FIG. 17a for compulsorily raising/lowering the objective lens for DVD 2b.

In FIGS. 17A–17E, the objective lens being lowered means such a state in which the objective lens for DVD 2b is moved in a direction away from the optical disc D, while the objective lens being raised means such a state in which the objective lens for DVD 2b is moved in a direction approaching to the optical disc D. Although disc discrimination is possible with the objective lens being raised or with the objective lens being lowered, it is assumed in the following explanation that disc discrimination is made from the signal derived with the objective lens being raised.

If the objective lens 2 is moved within the focusing search range, signal amplitudes of the pull-in signal PI are observed at a timing when the objective lens 2 reaches the disc surface just focus position shown in FIGS. 15b and 16b and at a timing when the objective lens 2 reaches the signal surface just focus position shown in FIGS. 15c and 16c.

If the disc loaded is the 1.2 mm single-plate disc having a separation of approximately 1.2 mm between the disc surface 105 and the signal surface 102, and the objective lens 2b is raised by the focusing search drive signal shown in FIG. 17a, a small signal amplitude is first observed at a timing of focusing on the disc surface 105, as shown in FIG. 17b, whilst a larger signal amplitude is observed at a timing of focusing on the signal surface 102. This pull-in signal is compared to a threshold value TH1 by a comparator circuit 29 for generating a discrimination signal DD as shown in FIG. 17c. This discriminating signal DD is routed to the system controller 30. The system controller 30 measures the time between the pulse of the discriminating signal DD obtained at a timing associated with the disc surface 105 and the pulse of the discriminating signal DD obtained at a timing associated with the signal surface 102. This measured time is denoted as t1.

If the disc loaded is the 0.6 mm double-plate disc having a separation of approximately 0.6 mm between the disc surface 128 and the signal surface 122, and the objective lens 2b is raised by the focusing search drive signal shown in FIG. 17a, a small signal amplitude is first observed at a timing of focusing on the disc surface 128, as shown in FIG. 17a, whilst a larger signal amplitude is observed at a timing of focusing on the signal surface 122. Thus, a discriminating signal $DD_{PI}$ shown in FIG. 17e is routed to the system controller 30. The system controller 30 measures the time between the pulse of the discriminating signal $DD_{PI}$ obtained at a timing associated with the disc surface 128 and the pulse of the discriminating signal $DD_{PI}$ obtained at a timing associated with the signal surface 122. This measured time is denoted as t2.

That is, the different measured values t1 and t2 are obtained as tx for the 1.2 mm single-plate disc and for the 0.6 mm laminated disc, due to the difference between the disc surface and the signal surface. Thus, if the system controller 30 holds an intermediate time tTH between measured values t1 and t2, as a reference value, it can be judged whether the measured time tx is t1 or t2 in FIG. 17, by comparing the measured time tx to the time tTH. That is, it can be judged whether the optical disc loaded is the CD 100 or the DVD 120.

Meanwhile, similar discrimination can be made with the objective lens being lowered. The reason is that the time difference between the two pulses of the disc discrimination signals $DD_{PI}$ is t3 in FIGS. 17c or t4 in FIG. 17e depending on whether the disc D is the CD 100 or the DVD 120. However, with the focusing search driving signal, shown in FIG. 17a, the objective lens is lowered at a higher speed than when it is raised, such that the measured time values t3 and t4 between the two pulses of the discriminating signal $DD_{PI}$ are shorter time values than the measured time values t1 and t2. Thus, in the instance of FIGS. 17A–17E, it is more meritorious for accurate discrimination to make discrimination with the objective lens being raised, although the clock frequency for counting the measured time needs to be taken into account. Such relative merit or demerit may, of course, be eliminated if the objective lens raising speed is set so as to be equal to the objective lens lowering speed. If the lowering speed is slower, it is more meritorious to make discrimination with the lens being lowered.

The processing by the system controller 30 in this case is hereinafter explained.

If it has not been judged whether the optical disc D loaded as the 1.2 mm single-plate disc or the 0.6 mm laminated disc, it does not matter, in a principle, which of the CD pickup 1a and the DVD pickup 1b is used first.

That is, one of the optical pickups is used for making disc discrimination in accordance with the system explained with reference to FIGS. 17A–17E. It does not matter which optical pickup is used for effectuating disc discrimination.

Figure 18:
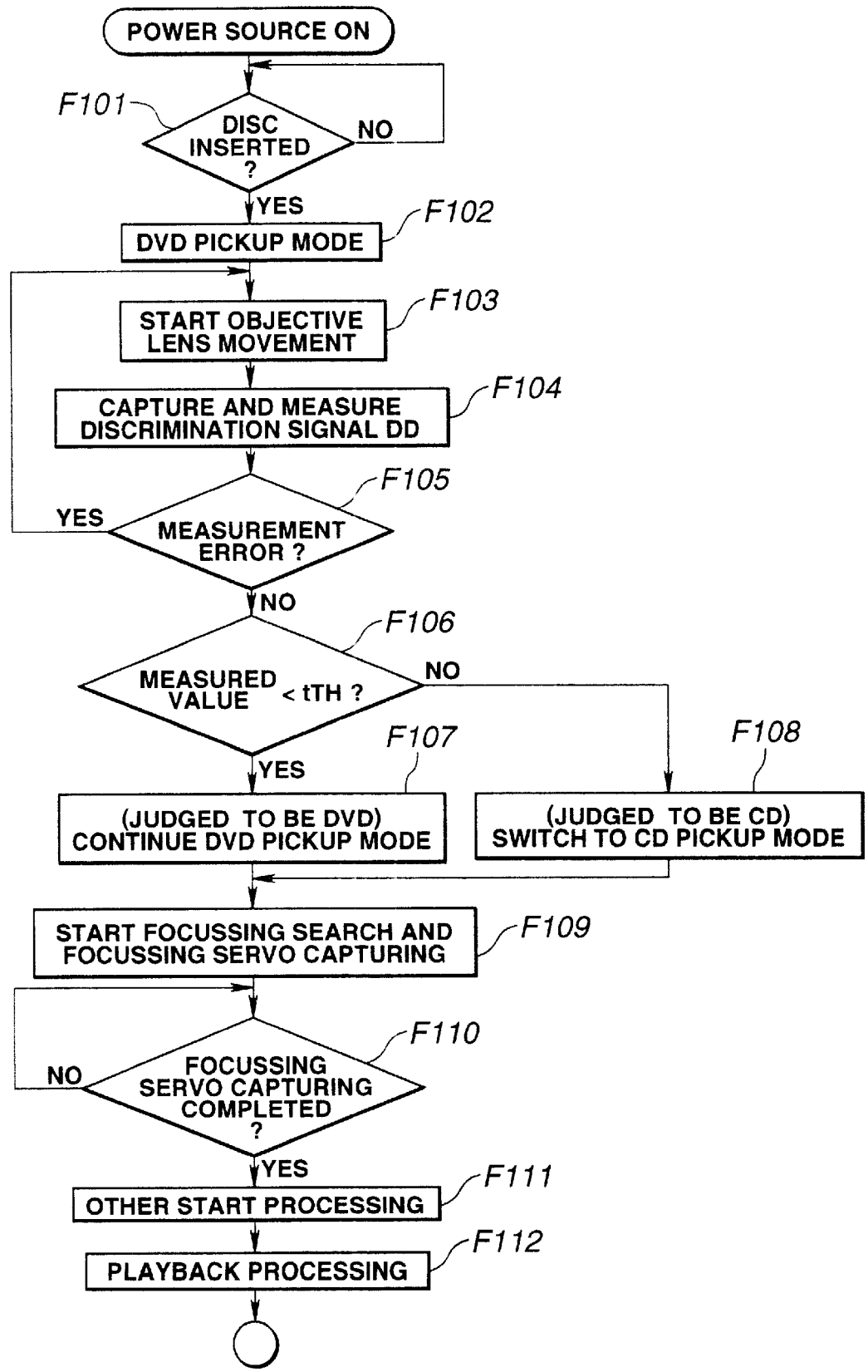
FIG. 18 is a flowchart for illustrating the operation of disc discrimination.

It is herein assumed that the DVD pickup 1b is used. Referring to FIG. 18, an illustrative processing of the system controller 30 in which a loaded optical disc D is discriminated as the disc type and subsequently reproduced is explained with reference to FIG. 18.

FIG. 18 shows a processing in which the power source is turned on. If the power source is turned on, and various parameters are set, by way of initializing operations, the system controller 30 waits for insertion of the optical disc D, as a first step F101.

If the optical disc D is inserted, processing transfers to step F102 to set the mode to the DVD pickup mode of employing the DVD pickup 1b.

This mode is a mode in which each switch 22, 24 has its terminal $T_{DV}$ connected in circuit. The system controller 30 then proceeds to steps F103 by way of disc type discrimination.

In this disc type discrimination, the DVD pickup 1b is used, because the DVD pickup mode is set at step F102.

For disc type discrimination, the DVD objective lens 1b is compulsorily raised or lowered within the focusing search range. This objective lens driving is started at step F103. That is, the start of outputting of the focusing search drive signal such as shown in FIG. 17a is commanded. Of course, the laser outputting of the laser diode 4b is also started at this time.

The system controller 30, managing control for raising or lowering the DVD objective lens 1b within the focusing search range, detects the disc discrimination signals DD supplied from the discrimination signal generating circuit 27, at step F104, for measuring the time period between two pulses shown in FIGS. 17c and 17e.

There are occasions wherein, due for example to too low of a reflection level on the disc surface, two pulses as disc discrimination signals DD are not correctly observed during raising or lowering of the DVD pickup 1b. In such case, a measurement error is deemed to have occurred at step F105 such that processing reverts to step F103 to effectuate again the objective lens driving and measurement. In actuality, limitations are preferably placed on the number of re-trial operations on occurrence of measurement errors without allowing an arbitrary number of retrial operations.

After measuring the time period between two pulses of the discriminating signal $DD_{PI}$, the measured time value is compared at step F106 to the time tTH as the reference value. If, as a result of the comparison, the measured value is longer, it is judged at step F108 that the optical disc D is the 1.2 mm single-plate disc, that is the CD 100.

Since the DVD pickup 1b has been used for the discriminating operation, the result of judgment indicates that this state is not in meeting with the currently loaded optical disc D (CD 100). Thus, the mode is switched at step F108 to the CD pickup mode. That is, the mode is set in which each of the switches 23 and to 24 has its terminal $T_{CD}$ connected in circuit and the CD pickup 1a is in use.

Conversely, if as a result of comparison at step F106, the reference time tTH is longer, it is judged at step F107 that the optical disc D is the 0.6 mm laminated disc, that is the DVD 120.

If the disc D is judged to be the DVD 120, the pickup mode state is not changed, because the DVD pickup mode has already been set.

If the pickup mode setting in meeting with the disc discrimination and the results of disc discrimination has come to a close, processing transfers to actual playback operation. That is, focusing search is started at step F109 to start the focusing search to pull-in the focusing servo. After the pull-in of the focusing servo has been terminated, processing transfers to step F110 and step F111 to carry out other starting operations. That is, processing of the servo system, such as adjusting the rotation of the spindle motor 6 and turning on of the tracking servo, is completed, while readout of the optical disc D is enabled. In addition, the necessary management information recorded on the optical disc D such as TOC, is read. After completion of these processing operations, processing transfers to step F112 to reproduce the CD 100 or the DVD 120.

Since the signal level of the pull-in signal PI=A+C+B+D is varied with reflectivity of the optical disc D, the system controller 30 calculates the reflectivity of the optical disc D from the disc discrimination signals $DD_{A/D}$ at a time point of completion of focusing servo pull-in. The system controller 30 switching-controls the changeover switch $SW_{APC}$ of the APC circuit enclosed in the laser drivers 20a, 20b, depending on the reflectivity of the optical disc D, for switching the closed-loop gain of the APC circuit between the single-layer disc and the double-layer disc. This enables laser light of optimum power from the laser diode LD of the optical pickup 1 to reach the single-layer disc and the double-layer disc to read out signals with stability from the optical disc D by the optical pickup 1 to produce playback RF signals with optimum S/N ratio.

The disc discrimination signals $DD_{A/D}$ can also be used for discriminating the optical discs D having different reflectivities with differences in the material of the recording layer making up the signal surface, such as CD and CD-RW or DVD and DVD-RW.

Figures 19A, 19B, 19C, 19D, 19E:
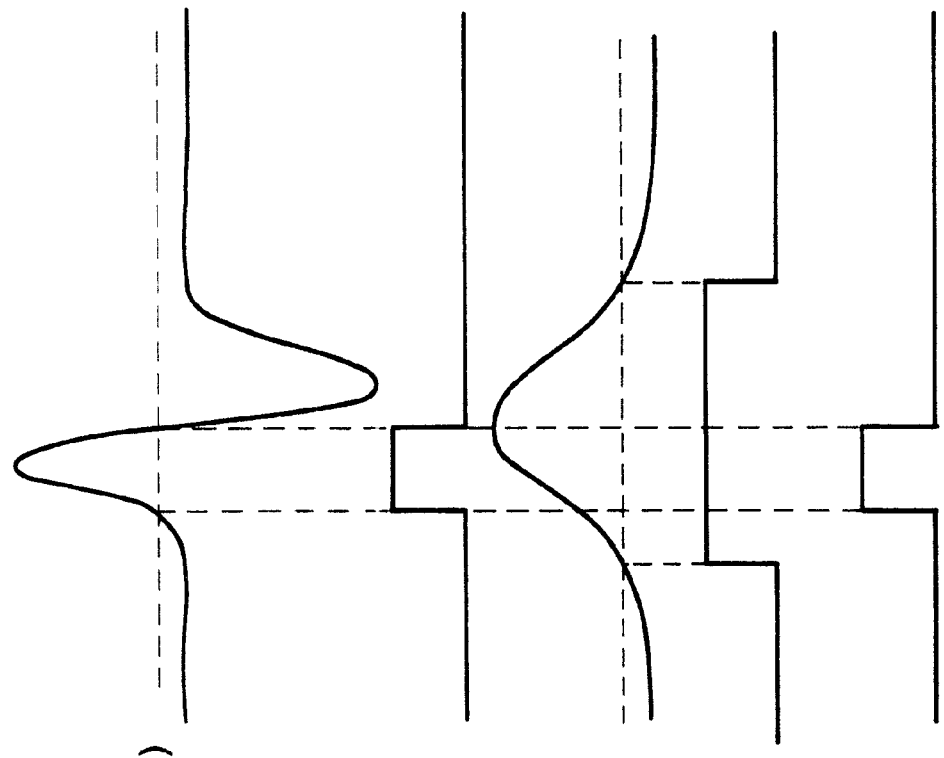
FIGS. 19A–19E are waveform diagrams showing a disc discrimination signal for a single-layer disc.

Referring to FIGS. 17A–17E, if the objective lens 2 is compulsorily moved within the focusing search range by the biaxial drivers 18a, 18b, by way of performing a focusing search operation, a sole S-curve is obtained as the focusing error signal FE and a pull-in signal PI is obtained within the range of the S-curve, as shown in FIGS. 19a and 19c, respectively, for a single-layer disc, whereas two S-curves are obtained as the focusing error signal FE and a pull-in signal is obtained astride the two s-curves, as shown in FIGS. 20a and 20c, respectively for a double-layered disc. It is noted that the focusing error signal FE and the pull-in signal PI are generated from the detection signals A, B, C and D by the detectors $S_A$, $S_B$, $S_C$ and $S_D$ of the eight-segment photodetector by the equations FE=(A+C)−(B+D) and PI=A+C+B+D, respectively. The focusing error signal FE and the pull-in signal PI are converted by the convert-to-binary circuits 61, 62 to find the logical product by the AND gate 63. That is, the pull-in signal PI=A+C+B+D, a sum signal of the detection signals A to D by the above photodetector, is converted to binary-valued signal at a pre-set level to generate the disc discrimination signals $DD_{PI}$ shown in FIGS. 19d, 20d as discriminating pulses, the number of which is counted during the gating period supplied by the gate pulse for discriminating the types of the optical discs D of different numbers of the signal recording layers based on the results of the counting. It is noted that, in the single-layer disc, the disc discrimination signal $DD_{AND}$ goes high 'H' only once by a sole focusing search operation, as shown in FIG. 19e, whereas, in the double-layer disc, the disc discrimination signal $DD_{AND}$ goes high 'H' twice by a sole focusing search operation, as shown in FIG. 20e. This discriminating operation enables discrimination of the optical disc D with variable reflectivities which is more accurate than that by the disc discrimination signals $DD_{A/D}$ representing the signal level of the pull-in signal PI.

Figure 21:
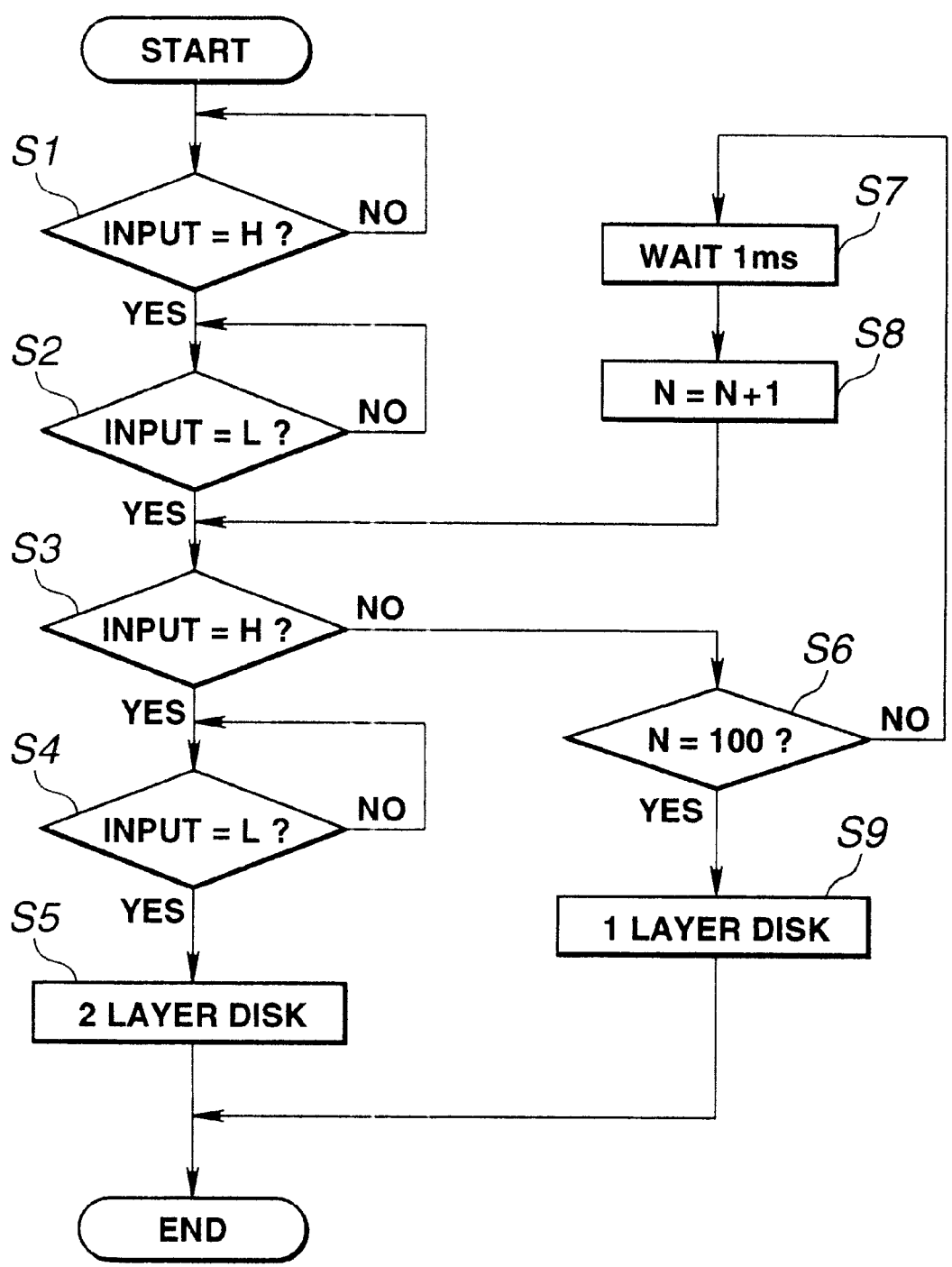
FIG. 21 is a flowchart for illustrating the sequence of operations for discriminating the single-layer disc and the double-layer disc by a system controller in the optical disc device.

That is, the system controller 30 can discriminate between the single-layer disc and the double-layer disc by the disc discriminating operation in accordance with the flowchart shown in FIG. 21.

Specifically, if the disc discriminating operation is started, it is judged at step S1 whether the input, that is the disc discrimination signals $DD_{AND}$, has gone high 'H'. If the input is 'H', processing transfers to step S2.

At this second step S2, it is judged whether or not the input, that is the disc discrimination signals $DD_{AND}$, is low 'L'. If the input is at logic 'L', processing transfers to step S3.

At this third step S3, it is judged whether or not the input, that is the discrimination signal $DD_{AND}$, has become logical H. When the input becomes logical H, processing transfers to step S4.

At this step S4, it is judged whether or not the input, that is the disc discrimination signals $DD_{AND}$, again is low 'L', if the input is logical 'L', processing transfers to step S5 to set parameters of various circuits associated with the double-layer disc.

If the result of decision at step S3 is NO, that is if the input is not again 'H', processing transfers to step S6.

At this sixth step S6, it is judged whether or not the number of times of repetition of the decision processing at the third step S3 is 100. If the result is NO, that is if N is not equal to 100, processing transfers to step S7 to wait for 1 ms. At the next step S8, N is set to N=N+1. Then, processing reverts to step S3. The decision processing of this third step S3 is repeated. If the result of decision at the sixth step S6 is YES, that is if N=100, that is if the pulse of the disc discrimination signals $DD_{AND}$ corresponding to the second layer is not obtained after lapse of 100 ms, processing transfers to step S9 to set parameters of respective circuits associated with the single-layer disc.

Figure 22:
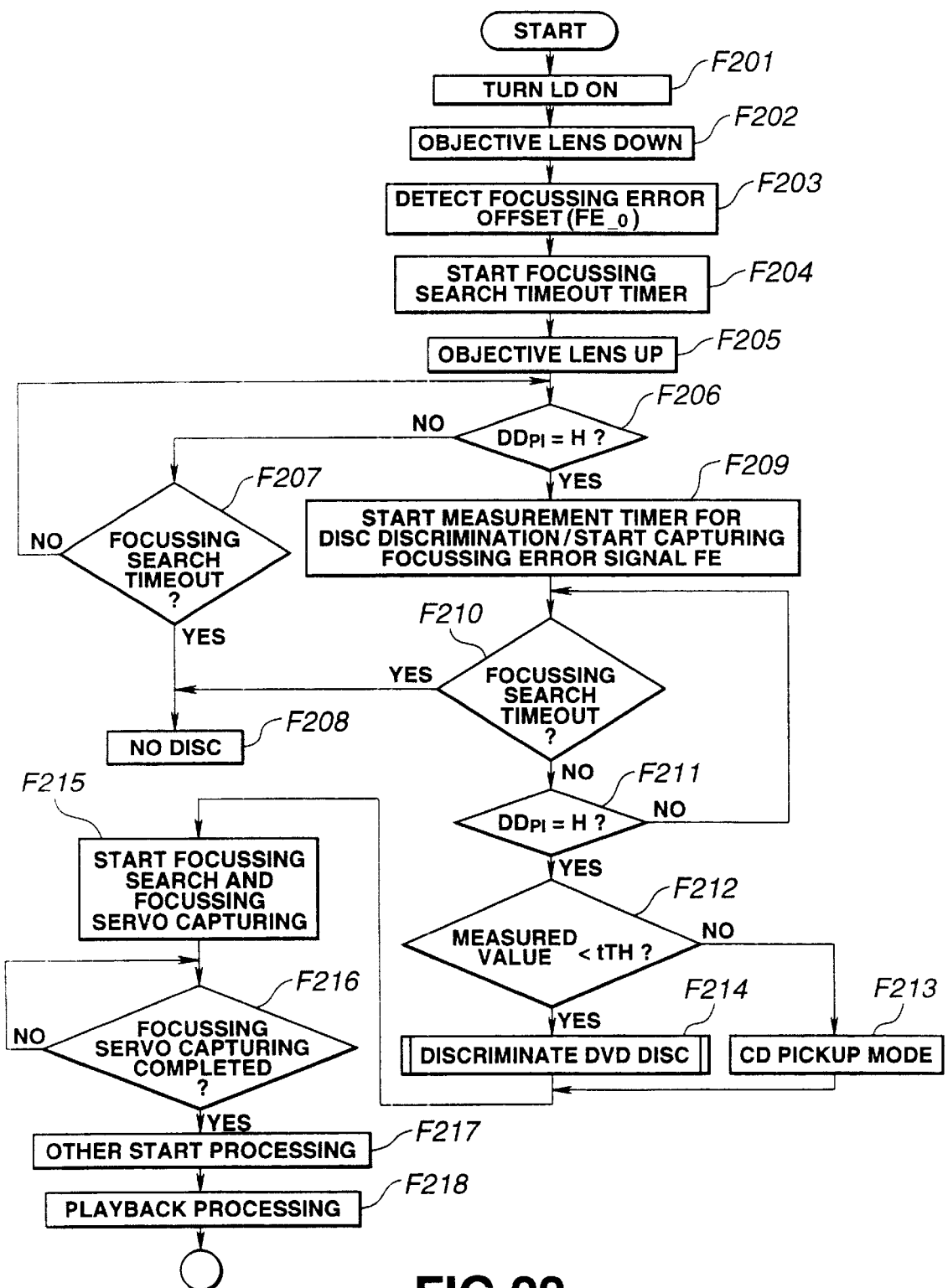
FIG. 22 is a flowchart for illustrating another example of the operations for discriminating the disc types by a system controller in the optical disc device.
Figure 23:
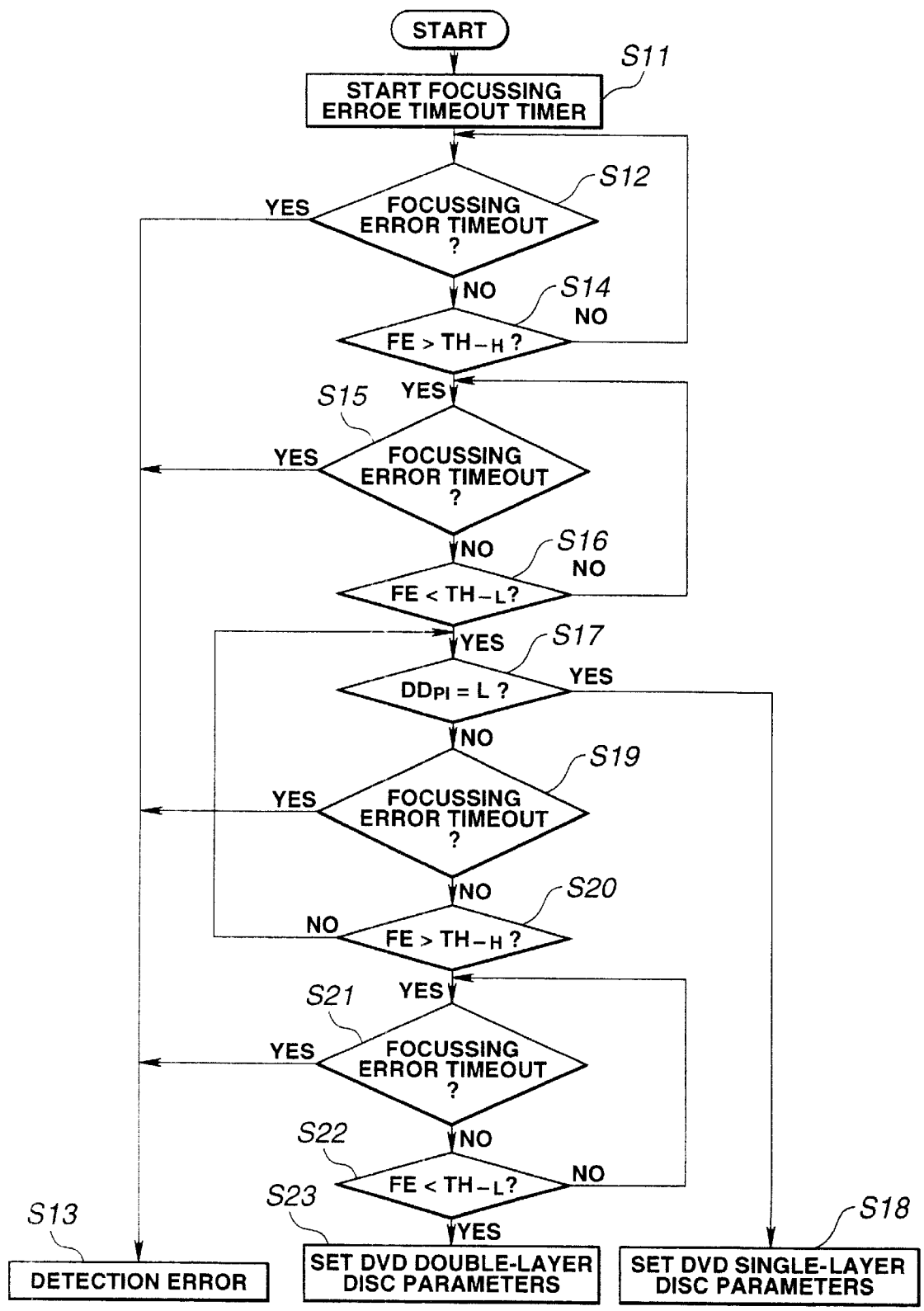
FIG. 23 is a flowchart for illustrating the sequence of operations for discriminating the single-layer disc and the double-layer disc in the example of the operations for discriminating the disc types by the system controller.

In the above-described embodiment, three types of the disc discrimination signals $DD_{A/D}$, $DD_{PI}$ and $DD_{AND}$ are used for discriminating the types of the optical discs D. The disc discrimination signal $DD_{A/D}$ is obtained by converting the signal level of the pull-in signal PI into digital data, whereas the disc discrimination signal $DD_{PI}$ is obtained by converting the pull-in signal PI into a binary-valued signal and the disc discrimination signal $DD_{AND}$ is obtained by ANDing the binary-valued version of the focusing error signal FE with the disc discrimination signal $DD_{PI}$. Alternatively, the disc discrimination signals $DD_{PI}$ obtained on converting the pull-in signal into the binary-valued signal and the disc discrimination signals $DD_{FE}$ obtained in converting the signal level of the focusing error signal FE into digital data may also be used for disc discrimination, as shown in the flowcharts of FIGS. 22 and 23. In this case, the focusing error signal FE is directly supplied to an A/D input port of the system controller 30.

As an operating example of using the DVD pickup 1b, an illustrative processing of the system controller 30 in which the type of the loaded optical disc D is discriminated on power up of the loaded optical disc device before proceeding to reproduction is explained with reference to FIGS. 22 to 24.

FIG. 22 is a flowchart showing the operation since power up until reproduction.

If the power source is turned on, and various parameters are first set, by way of initialization, the system controller 30 at step F201 first turns the laser diode 4b on. Then, at step F202, the system controller 30 compulsorily lowers the optical pickup for DVD 1b within the focusing search range at an optical axis position furthest away from the optical disc D. At step F203, the signal level of the focusing error signal FE, with the optical pickup for DVD 1b lying at the position furthest from the optical disc D, is sampled, with the sampled value being set as reference value FE_o.

At the next step F204, a focusing search timeout measurement timer is started. This focusing search timeout is set for preventing the voltage from being continuously applied across the focusing control in case of non-detection of the reflected light from the signal surface of the optical disc D and for preventing the system controller 30 from polling without proceeding to the next processing. The focusing search timeout is herein set to 800 ms.

At step F205, the search operation of raising the optical pickup for DVD 1b is started.

At step F206, it is judged whether or not the disc discrimination signals $DD_{PI}$ is at logical 'H'. Since the disc discrimination signals $DD_{PI}$ is a binary-valued version of the pull-in signal PI representing the light volume of the reflected light by the optical disc D, the logical 'H' is set for the state of detection of the surface or the reflected light from its signal surface, if the optical disc D is loaded in position.

If the result of judgment at step F206 is NO, that is if the disc discrimination signals $DD_{PI}$ is not at logical 'H', processing transfers to step F207 to judge whether or not the value of the focusing search timeout timer has reached 800 ms to reach timeout. If timeout has not been reached, processing reverts to step F206 so that the decision of the disc discrimination signals $DD_{PI}$ is repeated until timeout of the focusing search timeout timer. If the result of decision at step F207 is YES, that is if the focusing search timeout timer has timed out, a decision is given that the optical disc D has not been loaded and processing transfers to step F208 to display an indication such as 'no disc'.

If the result of decision at step F206 is YES, that is if the disc discrimination signals $DD_{PI}$ is at logic 'H', a decision is given that the optical disc D has been loaded in position. Thus, processing transfers to the next step F209 to start a disc discrimination timer and to start capturing of the signal level of the focusing error signal FE. At this step F209, it is detected that the disc discrimination signals $DD_{PI}$ has become logical 'H' based on the reflected light from the surface of the optical disc D.

At the next step F210, it is judged whether or not the focusing search timeout timer has reached 800 ms and timed out. If the timer has not timed out, processing transfers to step F211 to check whether or not the disc discrimination signals $DD_{PI}$ is at logical 'H'. If the result of decision at step F210 is YES, that is if the focusing search timeout timer has timed out, a decision is given that the optical disc D has not been loaded. Thus, processing transfers to the above step F208 to display an indication such as 'no disc'.

At step F211, it is judged whether or not the disc discrimination signals $DD_{PI}$ is at logical 'H'. At this step F211, it is detected that the disc discrimination signals $DD_{PI}$ is at logical 'H' by the reflected light from the signal surface of the optical disc D.

At the next step F212, it is judged whether or not the value of the disc discrimination timer is smaller than the reference time tTH. Specifically, at this step F212, it is judged whether or not the time which elapses since the disc discrimination signals $DD_{PI}$ is judged at step F206 by the reflected light from the surface of the optical disc D to be logical 'H' until the disc discrimination signals $DD_{PI}$ is judged at step F211 by the reflected light from the signal surface of the optical disc D to be logical 'H' is smaller than the reference time tTH. If the result of decision at this step F212 is NO, that is if the value of the disc discrimination timer is longer than the reference time tTH, the loaded optical disc D is judged to be a 1.2 mm single-plate disc, that is CD 100. Thus, processing transfers to step F213 to switch to the CD pickup mode of employing the CD pickup 1a.

If the result of decision at this step F212 is YES, that is if the value of the disc discrimination timer is shorter than the reference time tTH, the loaded optical disc D is judged to be a 0.6 mm laminated disc, that is DVD 120. Thus, processing transfers to step F214 to make disc discrimination of whether the DVD 120 is the single-layered disc or a double-layered disc in accordance with the flowchart shown in FIG. 23.

If the pickup mode setting corresponding to the disc discrimination and the results of the disc discrimination have come to a close, the system controller proceeds to actual reproducing processing. Specifically, the focusing search is started at step F215 for focusing servo pull-in. At step F216, it is judged whether or not focusing servo pull-in has been completed. If the result of judgment is YES, processing transfers to step F217 to perform other starting operations. That is, processing of the servo system, such as adjusting the rotation of the spindle motor 6 and turning on of the tracking servo, is completed, while the readout of the optical disc D is enabled. In addition, the necessary management information recorded on the optical disc D such as TOC, is read.

After completion of these processing operations, processing transfers to step F218 to reproduce the CD 100, DVD 120 or the DVD-RW 130.

The system controller 30 commands the servo processor 31 to drive the objective lens 2 as in the case of the focusing search. The servo processor 31 is responsive thereto to supply to the biaxial driver 18b a signal shown in FIG. 24a as a focusing search drive signal to drive the biaxial driver 3b for compulsorily raising the objective lens for DVD 2b. During the period when the disc discrimination signals $DD_{PI}$ is at logical 'H' it is judged how many times the S-curve is detected as being the focusing error signal FE using the first and second threshold values $TH_{\_H}$ and $TH_{\_L}$, for discriminating between the single-layer disc and the double-layer disc.

That is, in the processing for discriminating between the single-layer disc and the double-layer disc, a focusing error timeout timer is first started at the first step S11. This focusing search timeout is set for preventing the system controller 30 from polling without proceeding to the next processing in case of failure in detecting the S-curve as the focusing error signal FE during the logical 'H' period of the disc discrimination signals $DD_{PI}$. The focusing search timeout is herein set to 40 ms.

At the second step S12, it is judged whether or not the focusing error timeout timer has timed out. If the focusing error timeout timer has timed out, it is judged that a detection error has occurred, and processing transfers to step S13 to perform error processing. If the result of decision at the second step S12 is NO, that is if the focusing error timeout timer has timed out, processing transfers to a fourth step S14.

At the fourth step S14, the focusing error signal FE is captured via an A/D port to judge whether or not the signal level is larger than the first threshold value $TH_{\_H}$. If the result of decision at the fourth step S14 is NO, that is if the signal level of the focusing error signal FE is smaller than the first threshold value $TH_{\_H}$, processing reverts to the second step S12 to repeat the decision of timeout of the focusing error timeout timer. If the result of decision at the fourth step S14 is YES, that is if the signal level of the focusing error signal FE is larger than the first threshold value $TH_{\_H}$, processing reverts to the fifth step S15.

At the fifth step S15, it is judged whether or not the focusing error timeout timer has timed out. If the focusing error timeout timer has timed out, a detection error is judged to have occurred, such that processing transfers to a third step S13 to perform error processing. If the focusing error timeout timer has not timed out, processing transfers to a sixth step S16.

At this sixth step S16, the focusing error signal FE is captured via an A/D port to judge whether or not the signal level is smaller than the second threshold value $TH_{\_L}$. If the result of decision at this sixth step S16 is NO, that is if the signal level of the focusing error signal FE is larger than the second threshold value $TH_{\_L}$, processing reverts to the fifth step S15 to repeat the decision of timeout of the focusing error timeout timer. If the result of decision at this sixth step S16 is YES, that is if the signal level of the focusing error signal FE is smaller than the second threshold value $TH_{\_L}$, processing reverts to the seventh step S17.

At this seventh step S17, it is judged whether or not the disc discrimination signal $DD_{PI}$ is at the logical 'L'. If the result of judgment at this step S17 is YES, that is if the disc discrimination signal $DD_{PI}$ is at the logical 'L', it is judged that the disc is the single-layer disc in which the S-curve of the focusing error signal FE is detected only once during the logical 'H' period of the disc discrimination signal $DD_{PI}$. Thus, processing transfers to the eighth step S18 to set parameters of various circuits. If the result of judgment at this step S17 is NO, that is if the disc discrimination signal $DD_{PI}$ is at the logical 'H', processing transfers to a ninth step S19.

At this ninth step S19, it is judged whether or not the focusing error timeout timer has timed out. If the timer has timed out, it is judged that a detection error has occurred, and processing reverts to the third step S13 to perform error processing. If the result of judgment at step S19 is NO, that is if the focusing error timeout timer has not timed out, processing transfers to a tenth step S20.

At this tenth step S20, the focusing error signal FE is captured via A/D port to judge whether or not its signal level is larger than a first threshold value $TH\_H$. If the result of judgment at this tenth step S20 is NO, that is if the signal level of the focusing error signal FE is smaller than the first threshold value $TH\_H$, processing reverts to the ninth step S19 to repeat the decision of the timeout of the focusing error timeout timer. If the result of judgment at the tenth step s20 is YES, that is if the focusing error signal FE is larger than the first threshold value $TH\_H$, processing transfers to the eleventh step S21.

At this eleventh step S21, it is judged whether or not the focusing error timeout timer has timed out. If the timer has timed out, a detection error is judged to have occurred, and accordingly, processing transfers to the third step S13 to perform error processing. If the result of decision at the eleventh step S21 is NO, that is if the timer has not timed out, processing transfers to the twelfth step S22.

At this twelfth step S22, the focusing error signal FE is captured via A/D port to judge whether or not its signal level is smaller than a second threshold value $TH\_L$. If the result of decision at this step S22 is NO, that is if the signal level of the focusing error signal FE is larger than the second threshold value $TH\_L$, processing reverts to the eleventh step S21 to repeat the decision on timeout of the focusing error timeout timer. If the result of decision at this step S22 is YES, that is of the signal level of the focusing error signal FE is smaller than the second threshold value $TH\_L$, the disc D is judged to be a double-layer disc in which a S-curve of the focusing error signal FE is detected twice during the logical 'H' period of the disc discrimination signal $DD_{PI}$, as shown in FIG. 24C. Thus, processing transfers to a thirteenth step S23 to set parameters for various circuits associated with the double-layer disc.

The first and second threshold values $TH\_H$ and $TH\_L$ are given as $$TH\_H = FE\_o + W$$
$$TH\_L = FE\_o - W$$

where W is the width of a detecting window and $FE\_o$ is the reference value captured at the above step F203.

Thus, as shown in FIG. 24d, even if an offset is caused in the focusing error signal FE directly entering the A/D input port of the system controller 30, it is cancelled to enable correct disc discrimination.

Thus, with the optical disc device of the present invention, in which the closed-loop gain of the automatic power control means is controlled by control means to a gain corresponding to the reflectivity of the optical disc, based on the detection output of photodetector means when the focusing is applied to the signal surface of the optical disc, a laser light beam of an optimum power can be stably illuminated on plural sorts of optical discs. Thus, signals can be read out with stability from the optical disc by the photodetector means, thus giving playback RF signals with superior S/N ratio.

By discriminating the sorts of plural optical discs with different numbers of the signal recording layers by disc discriminating means based on the focusing error signals generated by the focusing control means on moving the objective lens by focusing search by the focusing control means along the optical axis for focusing search, and by setting the operating mode in meeting with the disc type by the control means based on the discrimination output, plural sorts of the optical discs can be reproduced reliably.

By illuminating the laser light on the signal surface of the optical disc via the objective lens, and by detecting the reflected light of the laser light from the signal surface of the disc, disc types with different numbers of signal recording layers can be discriminated easily based on the focusing error signals generated from the detection signals.

Since the operating characteristics of the tracking control means can be switched responsive to the disc types by the control means based on the decision output of the disc discrimination means, tracking control can be performed reliably on the plural disc types having different reflectivities.

Since the operating characteristics of the mirror signal generating means can be switched responsive to the disc types by the control means based on the decision output of the disc discrimination means, mirror signals can be reliably produced for the plural disc types by the mirror signal generating means.

Since the detection system of the tracking control means can be switching-set responsive to the disc types by the control means based on the decision output of the disc discrimination means, tracking control can be performed reliably on plural disc types having different reflectivities.

What is claimed is:

1. An optical disc device comprising:
   a laser light source for radiating a laser light beam illuminated via an objective lens on a signal surface of an optical disc;
   laser light intensity detection means for detecting the light intensity of the laser light radiated from said laser light source;
   automatic power controlling means for controlling a laser output of said laser light source so that a detection output by said laser light intensity detection means will be constant for two laser light intensities corresponding to two types of optical discs having different numbers of signal surfaces and unique reflectivities;
   return light detection means for detecting the return light of the laser light beam radiated by said laser light source and reflected by the signal surface of said optical disc;
   focusing control means for displacing said objective lens along the optical axis responsive to the focusing error signals generated on the basis of a detection output of said return light detection means for controlling the focusing state of a beam spot of said laser light on the signal surface of said optical disc; and
   controlling means for controlling a closed-loop gain of said automatic power controlling means to a gain in meeting with the reflectivity of the optical disc based on a detection output of said return light detection means which prevails when focusing is applied to the signal surface of the optical disc by said focusing control means,
   wherein said laser light intensity varies depending on the closed loop gain.

2. The optical disc device as claimed in claim 1, wherein said controlling means finds the reflectivity of the optical disc from the signal level of a detection signal corresponding to the light volume of the reflected return light detected by said return light detection means for controlling the closed-loop gain of said automatic power controlling means to a gain in meeting with the reflectivity of the optical disc.

3. The optical disc device as claimed in claim 1, wherein said control means includes means for discriminating the type of the optical disc based on a detection output of said return light detection means for switching the closed-loop gain of said automatic power controlling means to a gain in meeting with the discriminated disc type.

4. The optical disc device as claimed in claim 3, wherein said discriminating means discriminates between a single-layer disc having a sole signal surface and a double-layer disc having two signal surfaces based on a detection output of said return light detection means.

5. The optical disc device as claimed in claim 1, wherein said control means includes means for discriminating the type of the optical disc based on focusing error signals from said return light detection means during focusing searching of said objective lens, said control means switching the closed-loop gain of said automatic power controlling means to a gain which is in meeting with the discriminated optical disc type.

6. The optical disc device as claimed in claim 5 wherein said discriminating means discriminates between a single-layer disc having a sole signal surface and a double-layer disc having two signal surfaces based on said focusing error signals.

7. The optical disc device as claimed in claim 6 wherein said control means manages control for lowering the closed-loop gain of said automatic power controlling means if the discriminated disc type indicates the double-layered disc to a lower value than if the discriminated disc type indicates the single-layered disc.

8. The optical disc device as claimed in claim 1, wherein said control means includes means for discriminating between a first optical disc having a pre-set reflectivity and a second optical disc having a reflectivity lower than that of said first optical disc, based on the focusing error signals from said return light detection means during focusing searching of said objective lens, said return light detection means managing control for lowering the closed-loop gain of said automatic power controlling means if the discriminated disc type indicates the double-layered disc to a lower value than if the discriminated disc type indicates the single-layered disc.

9. An optical disc device comprising:
    a laser light source for radiating a laser light beam illuminated via an objective lens on a signal surface of an optical disc;
    laser light light detection means for detecting the light intensity of the laser light radiated from said laser light source;
    automatic power controlling means for controlling a laser output of said laser light source so that a detection output by said laser light intensity detection means will be constant for two laser light intensities corresponding to two types of optical discs having different numbers of signal surfaces and unique reflectivities;
    return light detection means for detecting the return light of the laser light beam radiated by said laser light source and reflected by the signal surface of said optical disc;
    focusing control means for displacing said objective lens along the optical axis responsive to the focusing error signals generated on the basis of a detection output of said return light detection means for controlling the focusing state of a beam spot of said laser light on the signal surface of said optical disc; and
    controlling means for controlling a closed-loop gain of said automatic power controlling means based on a detection output of said return light detection means which prevails when focusing is applied to the signal surface of the optical disc by said focusing control means,
    wherein said laser light intensity varies depending on the closed loop gain.

10. The optical disc device as claimed in claim 9, wherein said discriminating means discriminates between a single-layer disc having a sole signal surface and a double-layer disc having two signal surfaces based on a detection output of said return light detection means, said controlling means managing control for lowering the closed-loop gain of said automatic power controlling means if the discriminated disc type indicates the double-layered disc to a lower value than if the discriminated disc type indicates the single-layered disc.

11. The optical disc device as claimed in claim 10 wherein said controlling means includes means for discriminates between a single-layer disc having a sole signal surface and a double-layer disc having two signal surfaces based on a detection output of said return light detecting means, said controlling means managing control for switching the closed-loop gain of said automatic power controlling means to a gain associated with each signal surface.

12. An optical disc device, comprising:
    a laser light source for radiating a laser light beam illuminated via an objective lens on a signal surface of an optical disc;
    a monitor photodiode for detecting the light intensity of the laser light radiated from said laser light source;
    an automatic power control circuit for controlling a laser output of said laser light source so that a detection output detected by said monitor photodiode will be substantially constant for two laser light intensities corresponding to two types of optical discs having different numbers of signal surfaces and unique reflectivities;
    a reflected light photodetector for detecting light emitted from the laser light source and reflected by the signal surface of said optical disc;
    a servo processor for displacing said objective lens along the optical axis responsive to focusing error signals generated on the basis of a detection output of said reflected light photodetector for controlling the focusing state of a beam spot of said laser light beam on the signal surface of said optical disc; and
    a system processor for controlling a closed-loop gain of said automatic power control circuit based on a detection output of said reflected light photodetector which varies depending on the reflectivity of the optical disc and which prevails when focusing is applied to the signal surface of the optical disc by said servo processor,
    wherein said laser light intensity varies depending on the closed loop gain.

13. The optical disc device as claimed in claim 12, wherein said system processor determines the reflectivity of the optical disc from the signal level of a detection signal corresponding to a light intensity detected by the reflected light photodiode for controlling the closed-loop gain of said automatic power control circuit based on the reflectivity of the optical disc.

14. The optical disc device as claimed in claim 12, wherein said system processor discriminates the type of the optical disc based on a detection output of said reflected light photodetector and switches the closed-loop gain of said automatic power control circuit to the gain corresponding to the discriminated optical disc type.

15. The optical disc device as claimed in claim 14, wherein said system processor discriminates between a single-layer disc having a sole signal surface and a double-layer disc having two signal surfaces based on a detection output of said reflected light photodetector.

16. The optical disc device as claimed in claim 12, wherein said system processor discriminates the type of the optical disc based on focusing error signals from said reflected light photodetector during focusing searching of said objective lens, and switches the closed-loop gain of said automatic power control circuit to a gain corresponding to the discriminated optical disc type.

17. The optical disc device as claimed in claim 16, wherein said system processor discriminates between a single-layer disc having a sole signal surface and a double-layer disc having two signal surfaces based on said focusing error signals.

18. The optical disc device as claimed in claim 17, wherein said system processor manages control for lowering the closed-loop gain of said automatic power control circuit if the discriminated disc type indicates the double-layer disc to a lower value than if the discriminated disc type indicates the single-layer disc.

19. The optical disc device as claimed in claim 12, wherein said system controller discriminates between a double layer disc having a first reflectivity and a single layer disc having a second reflectivity lower than the first reflectivity based on the focusing error signals from said reflected light photodetector during focusing searching of said objective lens, and manages control for lowering the closed-loop gain of said automatic power control circuit if the discriminated disc type indicates the double-layered disc to a lower value than if the discriminated disc type indicates the single-layered disc.

20. An optical disc device comprising:
 a laser light source for radiating a laser light beam illuminated via an objective lens on a signal surface of an optical disc;
 a monitor photodiode for detecting the light intensity of the laser light radiated from said laser light source;
 an automatic power control circuit for controlling a laser output of said laser light source so that a detection output detected by said monitor photodiode will be substantially constant for two laser light intensities corresponding to two types of optical discs having different numbers of signal surfaces and unique reflectivities;
 a reflected light photodetector for detecting light emitted from the laser light source and reflected by the signal surface of said optical disc;
 a servo processor for displacing said objective lens along the optical axis responsive to focusing error signals generated on the basis of a detection output of said reflected light photodetector for controlling the focusing state of a beam spot of said laser light beam on the signal surface of said optical disc; and
 a system processor for controlling a closed-loop gain of said automatic power control circuit based on a detection output of said return light photodetector which prevails when focusing is applied to the signal surface of the optical disc by said servo processor,
 wherein said laser light intensity varies depending on the closed loop gain.

21. The optical disc device as claimed in claim 20, wherein said system processor discriminates between a single-layer disc having a sole signal surface and a double-layer disc having two signal surfaces based on a detection output of said return light photodetector, and manages control for lowering the closed-loop gain of said automatic power controlling means if the discriminated disc type indicates the double-layered disc to a lower value than if the discriminated disc type indicates the single-layered disc.

22. The optical disc device as claimed in claim 20, wherein said system controller discriminates between a single-layer disc having a sole signal surface and a double-layer disc having two signal surfaces based on a detection output of said reflected light photodetector, and manages control for switching the closed-loop gain of said automatic power control circuit to a gain associated with each signal surface.

23. A method for discriminating a type of an optical disc loaded in an optical disc device and controlling an output of a laser light source based on the discriminated disc type, comprising the steps of:
 radiating a laser light beam from said laser light source via an objective lens on a signal surface of said optical disc;
 detecting an emitted light intensity of the laser light radiated from said laser light source;
 controlling a laser output of said laser light source so that the detected light intensity will be substantially constant for two laser light intensities corresponding to two types of optical discs having different numbers of signal surfaces and unique reflectivities;
 detecting a reflected light intensity of the laser light radiated from the laser light source and reflected by the signal surface of said optical disc;
 displacing said objective lens along the optical axis responsive to focusing error signals generated on the basis of the detected reflected light intensity;
 controlling the focusing state of a beam spot of said laser light on the signal surface of said optical disc; and
 controlling a closed-loop gain based on the detected reflected light intensity which varies depending on the reflectivity of the optical disc and which prevails when focusing is applied to the signal surface of the optical disc,
 wherein said laser light intensity varies depending on the closed loop gain.

24. The method of claim 23, further comprising the steps of:
 determining the reflectivity of the optical disc from the signal level of the detected reflected light intensity; and
 controlling the closed-loop gain based on the determined reflectivity of the optical disc.

25. The method of claim 23, further comprising the steps of:
 discriminating the type of the optical disc based on the detected reflected light intensity; and
 switching the closed-loop gain to a gain corresponding to the discriminated optical disc type.

26. The method of claim 25, wherein said discriminating step includes the step of discriminating between a single-layer disc having a sole signal surface and a double-layer disc having two signal surfaces based on the detected reflected light intensity.

27. The method of claim 23, further comprising the steps of:
   discriminating the type of the optical disc based on the focusing error signals during focusing searching of said objective lens; and
   switching the closed-loop gain to a gain corresponding to the discriminated optical disc type.

28. The method of claim 27, wherein the discriminating step includes the step of discriminating between a single-layer disc having a sole signal surface and a double-layer disc having two signal surfaces based on said focusing error signals.

29. The method of claim 28, wherein said switching step includes the step of lowering the closed-loop gain if the discriminated disc type indicates the double-layer disc to a lower value than if the discriminated disc type indicates the single-layer disc.

30. The method of claim 23, further comprising the steps of:
   discriminating between a double-layer disc having a first reflectivity and a single layer disc having a second reflectivity lower than said first reflectivity based on the focusing error signals during focusing searching of said objective lens; and
   lowering the closed-loop gain if the discriminated disc type indicates the double-layer disc to a lower value than if the discriminated disc type indicates the single-layer disc.

31. A method for discriminating a type of an optical disc loaded in an optical disc device and controlling an output of a laser light source based on the discriminated disc type, comprising the steps of:
   radiating a laser light beam from said laser light source via an objective lens on a signal surface of said optical disc;
   detecting an emitted light intensity of the laser light radiated from said laser light source;
   controlling a laser output of said laser light source so that the detected light intensity will be substantially constant for two laser light intensities corresponding to two types of optical discs having different numbers of signal surfaces and unique reflectivities;
   detecting a reflected light intensity of the laser light radiated from the laser light source and reflected by the signal surface of said optical disc;
   displacing said objective lens along the optical axis responsive to focusing error signals generated on the basis of the detected reflected light intensity;
   controlling the focusing state of a beam spot of said laser light on the signal surface of said optical disc;
   controlling a closed-loop gain of a power control circuit of said laser light source based on the detected reflected light intensity which prevails when focusing is applied to the signal surface of the optical disc,
   wherein said laser light intensity varies depending on the closed loop gain.

32. The method of claim 31, further comprising the steps of:
   discriminating between a single-layer disc having a sole signal surface and a double-layer disc having two signal surfaces based on the detected reflected light intensity; and
   lowering the closed-loop gain if the discriminated disc type indicates the double-layered disc to a lower value than if the discriminated disc type indicates the single-layered disc.

33. The method of claim 31, comprising the steps of:
   discriminating between a single-layer disc having a sole signal surface and a double-layer disc having two signal surfaces based on the detected reflected light intensity; and
   switching the closed-loop gain to a gain associated with each signal surface.

* * * * *

UNITED STATES PATENT AND TRADEMARK OFFICE
CERTIFICATE OF CORRECTION

PATENT NO. : 6,252,834 B1  
DATED : June 26, 2001  
INVENTOR(S) : Eiji Kumagai

Page 1 of 1

It is certified that error appears in the above-identified patent and that said Letters Patent is hereby corrected as shown below:

Column 15,
Line 39, delete "a"; and
Line 48, change "the" to -- a --.

Signed and Sealed this

Twelfth Day of March, 2002

Attest:

JAMES E. ROGAN
Attesting Officer   Director of the United States Patent and Trademark Office